United States Patent [19]
Taneya et al.

[11] Patent Number: 5,657,307
[45] Date of Patent: Aug. 12, 1997

[54] OPTICAL DATA READING APPARATUS AND METHOD

[75] Inventors: Mototaka Taneya, Nara; Tatsuya Morioka, Tenri; Hidenori Kawanishi, Nara; Atsushi Shimonaka, Nara-ken, all of Japan

[73] Assignee: Sharp Kabushiki Kaisha, Osaka, Japan

[21] Appl. No.: 403,257

[22] Filed: Mar. 10, 1995

[51] Int. Cl.$^6$ .................................................. G11B 7/00
[52] U.S. Cl. ........................................... 369/116; 369/124
[58] Field of Search ................................. 369/112, 116, 369/44.37, 13, 58, 100, 32, 124

[56] References Cited

U.S. PATENT DOCUMENTS

| | | | |
|---|---|---|---|
| 4,660,187 | 4/1987 | Yoshino et al. | 369/13 |
| 4,837,759 | 6/1989 | Miyazaki et al. | 369/32 |
| 5,214,633 | 5/1993 | Tanno et al. | 369/112 |
| 5,235,588 | 8/1993 | Miura et al. | 369/13 |
| 5,325,350 | 6/1994 | Morimoto et al. | 369/110 |
| 5,436,884 | 7/1995 | Taneya | 369/112 |
| 5,436,885 | 7/1995 | Okumura et al. | 369/44.37 |

FOREIGN PATENT DOCUMENTS

| | | |
|---|---|---|
| 1291478 | 11/1989 | Japan . |
| 4-134937 | 5/1992 | Japan . |
| 4-134936 | 5/1992 | Japan . |

OTHER PUBLICATIONS

Kuroyanagi, "Radio transmission circuit" *Digital Communication Circuit* (1990) pp. 235, 245–247.
Nishi, "Measurement of oscillation by an optical heterodyne method" *O plus E* No. 150, (1992) pp. 108–113.
U.S. Patent Application Serial Number 08/125,473 to Taneya (filed Sep. 22, 1993).

*Primary Examiner*—Nabil Hindi

[57] ABSTRACT

An optical data reading method and apparatus for photoelectrically converting reflection light of a laser beam radiated onto a recording medium and thereby reproducing digital data recorded in the recording medium, performing a coherent detection by photoelectrically converting a first laser beam having a light frequency $v_1$ and a second laser beam having a light frequency $v_2$, where $v_1-v_2 \geq R$ (R: rate of reading the digital data), in a state where wavefronts of the first and second laser beams are aligned with each other, detecting temporal changes of either an amplitude or a phase of a beat signal component of the first and second laser beams, having a frequency of $(v_1-v_2)$ and being included in an photoelectrically converted output, and reading the digital data recorded in the recording medium based on a result of detection.

4 Claims, 16 Drawing Sheets

OPTICAL DATA READING APPARATUS AND METHOD

BACKGROUND OF THE INVENTION

1. Field of the Invention

The present invention relates to an optical data reading method using a reading apparatus for an optical memory (referred to as an "optical pickup", hereinafter), and in particular to an optical data reading method and an optical data reading apparatus suitably used for a high density optical recording system.

2. Description of the Related Art

An optical memory system utilizing light for recording reproducing data is widely used today due to advantages thereof such as large capacity, lower cost per bit, and portableness. So, such an optical system is put into practical use as read only memories such as compact discs and video discs and re-writable optical memories such as magneto-optical discs. In the future, such optical memories having a larger capacity and a smaller size will be demanded as society becomes more and more information-oriented.

FIG. 20 shows one configuration of a conventional optical pickup designed for reading data stored in a magnetooptical disc. This optical pickup includes a semiconductor laser element 1901 serving as a light source, a collimator lens 1902, a beam shaping prism 1903, a first beam splitter 1904, an objective lens 1905, a magnetooptical recording medium 1906, a second beam splitter 1907, a λ/2 plate 1908, a polarization beam splitter 1909, signal light condenser lenses 1910 and 1911, PIN light receiving elements 1912 and 1913, a condenser lens 1915 for detecting a tracking error/focus error, a light receiving element 1916 for detecting a tracking error/focus error, and a magnet 1917 for applying a magnetic field to the magnetooptical recording medium (hereinafter, referred to as a "disc") 1906. The operation of this optical pickup will be described hereinafter.

A laser beam emitted diagonally upwards by the semiconductor laser element 1901 is converted into a plane wave by the collimator lens 1902 and is incident onto the beam shaping prism 1903. The laser beam incident onto the beam shaping prism 1903 is shaped into a circular beam. Herein, the light emitted by the semiconductor laser element 1901, passed through the collimator lens 1902 and output from the beam shaping prism 1903 is all linearly polarized light.

Then, the linearly polarized laser light is condensed by the objective lens 1905, and then radiated onto the magnetooptical disc 1906 located above the objective lens 1905. Data is digitally recorded in the magnetooptical disc 1906 by magnetizing the magnetooptical disc 1906 perpendicularly to the surfaces thereof. When the laser beam is reflected by the magnetoopical disc 1906, the plane of polarization of the laser beam is rotated by a Kerr effect in accordance with the data stored in the magnetooptical disc 1906. Depending on whether the recorded digital data (digital signal) is "0" or "1", the rotation direction of the plane of polarization of the laser beam when the data is "1" is opposite to that when the data is "0". Accordingly, using this principle, the digital data "0" and "1" can be read by detecting in which direction the plane of polarization is rotated.

The signal light reflected by the magnetooptical disc 1906 is turned at 90° by the first beam splitter 1904 and then incident onto the second beam splitter 1907, whereby it is divided into first and second light components in horizontal and vertical directions, respectively. The first component in a horizontal direction serves as a beam for detecting a tracking error/focus error. The first light component is condensed by the condenser lens 1915, and thereafter is guided to the light receiving element 1916 so as to be photoelectrically converted. Thus, a tracking error/focus error signal, which is an electric signal, is obtained.

On the other hand, the second light component in a vertical direction serves as light for detecting a recorded signal. The plane of polarization of the second light component is rotated at 45° by the λ/2 plate 1908. FIG. 21 shows polarization components of reflection light from the disc 1906 in this state. At this time, within the reflection light from the disc 1906, light 2001 of which plane of polarization is rotated by the disc 1906 and a non-rotation component 2002 resulting from the reflection from surfaces and the like of various optical components located in the optical path, are superimposed on each other. Then, by the polarization beam splitter 1909 located on the outgoing side of the λ/2 plate 1908, the reflection light including thus superimposed components is divided into two components perpendicular to each other, i.e., an s-wave component and a p-wave component as shown in FIG. 21.

The p-wave component is transmitted straight through the polarization beam splitter 1909, i.e., the beam travels downwards in a vertical direction, whereas the s-wave component is turned at 90° by the polarization beam splitter 1909 so as to travel in a horizontal direction. Following this, the p-wave component is condensed by the condenser lens 1911 and guided to the high speed PIN light receiving element 1913 so as to be photoelectrically converted. Likewise, the s-wave component is condensed by the condenser lens 1910 and thereafter guided to the high-speed light receiving element 1912 so as to be photoelectrically converted. The electric signals respectively converted by the two high speed PIN light receiving elements 1912 and 1913 are amplified by the differential amplifier 1914 to a predetermined level, and any difference therebetween is detected. Hence, the non-rotation reflection light component 2002 as shown in FIG. 21 is eliminated. As a result, only the signal light 2001 which is the light component of the light rotated by the recording magnetization is detected as an electric signal. Then, the recorded data is reproduced from a detection output of the differential amplifier 1914.

In the case of the signal light 2001 shown in FIG. 21, the p-wave component is larger than the s-wave component. Accordingly, the detection output from the differential amplifier 1914, i.e., (p-wave component)–(s-wave component) is an electric signal having a positive value. Conversely, in the case where the plane of polarization is rotated in the opposite direction to that of the signal light 2001, i.e., in the case where the optical data is recorded in the magnetooptical disc 1906 by magnetizing the disc in the opposite direction, the s-wave component is larger than the p-wave component. In such a case, the detection output is an electric signal having a negative value.

In the above mentioned optical pickup, through the differential amplifier 1914 of a type directly detecting the intensity of light is provided as a means for detecting the recorded data, an optical pickup provided with a detection means employing a direct detection method of other types is also known. However, in all types of conventional optical pickup including an optical pickup for a magnetooptical disc, a direct detecting method for directly detecting the intensity of light is used for signal detection.

For an optical disc memory, a larger capacity and a higher reading speed (realization of a high-speed access) will be increasingly demanded. In order to fulfill such demands, a magnetooptical disc having a higher density recording medium and a higher rotation speed is required. In accordance with such development in the density and the optation speed, a recording area allocated for one bit, i.e., one recording unit is further reduced. As a result, the intensity of signal light reflected by the recording medium is lowered, and the pulse width of the signal light per bit is decreased. In other words, the amount of energy of the signal light per bit is reduced.

Under these circumstances, in an optical pickup having the above-mentioned light intensity detecting mechanism, the power level of the signal light becomes close to those of shot noises and thermal noises in the light receiving circuit. For this reason, an existing optical pickup system using light having a wavelength of 780 nm has a problem in that the bit error rate exceeds $10^{-5}$ when reading data stored in a disc having a high density of 1 Mbit/mm$^2$ or more, which is disadvantageous in practical use. This is because, in the direct detection method, a C/N value is degraded in proportion to the fourth power of the attenuation of the intensity of the reflection light, and in inverse proportion to the first power of an increase in the data reading rate.

As one method for solving this problem, the use of laser beams having a shorter wavelength as a light source has been actively studied. However, a laser of a short wavelength is not put into practical use in accordance with the needs for such an optical disc memory with a large capacity. Even if a laser for emitting light having a desirably short wavelength is developed, an optical memory having a still larger capacity which can be operated using such a laser is demanded. In consideration of these matters, this approach also has a problem in that a highly sensitive detecting mechanism is required.

Also, for realizing the recording of data at a higher density, a method of improving the substantial recording density by configuring the recording medium so as to be multi-layered has been examined. However, in a method of reading data from a conventional multi-layered recording medium, for selecting a specific recording medium layer within the multi-layered recording medium, there has been adopted an element using only the focal depth of a lens for condensing and radiating a laser beam. As a result, the reflection light is likely to overlap with the data from the layers other than a reading target layer, which causes noise. Thus, the data reading at a sufficient bit error rate cannot be achieved.

For the above-mentioned reasons, a conventional optical pickup cannot be used with improved optical discs of a larger capacity and higher recording density and is capable of accessing at a higher speed.

SUMMARY OF THE INVENTION

The optical data reading method of this invention for photoelectrically converting reflection light of a laser beam radiated onto a recording medium and thereby reproducing digital data recorded in the recording medium, includes the steps of: performing a coherent detection by photoelectrically converting a first laser beam having a light frequency $v_1$ and a second laser beam having a light frequency $v_2$, where $v_1-v_2 \geq R$ (R: rate of reading the digital data), in a state where wavefronts of the first and second laser beams are aligned with each other; detecting temporal changes of either an amplitude or a phase of a beat signal component of the first and second laser beams, having a frequency of $(v_1-v_2)$ and being included in a photoelectrically converted output; and reading the digital data recorded in the recording medium based on a result of detection.

In one embodiment of the invention, the first and second laser beams are reflection light of two laser beams radiated onto one identical point on the recording medium in a common focal point state.

In another embodiment of the invention, based on a value of a beat signal frequency detected from the beat signal component, two semiconductor laser light sources for emitting the first and second laser beams are controlled so that a light frequency difference between the first and second laser beams is kept constant.

In another embodiment of the invention, a laser beam having the same light frequency is divided into two parts and the divided laser beam is condensed and radiated onto one identical point on the recording medium in a common focal point state and at a certain angle, while the recording medium is moved in a direction of the angle formed when the divided laser beam is condensed and radiated, and thereby a light frequency difference between the first and second laser beams is kept constant.

According to another aspect of the invention, an optical data reading apparatus for photoelectrically converting reflection light of a laser beam radiated onto a recording medium having at least one recording medium layer and thereby reproducing digital data recorded in the recording medium, includes: laser beam generating means for generating a first laser beam having a light frequency $v_1$ and a second laser beam having a light frequency $v_2$ from a laser beam emitted from at least one semiconductor laser light source; frequency difference keeping means for keeping a frequency difference of $(v_1-v_2)$ between the first and second laser beams at substantially constant value higher than rate R (R: rate of reading the digital data); mixing means for mixing the first and second laser beams in a state that wavefronts thereof are aligned with each other; at least one photoelectrically converting means for photoelectrically converting the mixed first and second laser beams; detecting means for detecting temporal changes of either an amplitude or a phase of a beat signal component of the first and second laser beams, having a frequency of $(v_1-v_2)$ and being included in an output of the photoelectrically converting means; and reproducing means for reproducing the digital data recorded in the recording medium from a detection output of the detecting means.

In one embodiment of the invention, the laser beam generating means causes the first and second laser beams to be generated from reflection light of two laser beams radiated onto one identical point on the recording medium in a common focal point state.

In another embodiment of the invention, the frequency difference keeping means controls two semiconductor laser light sources for emitting the first and second laser beams based on a value of a beat signal frequency detected from the beat signal component so that a light frequency difference between the first and second laser beams is kept constant.

In another embodiment of the invention, the frequency difference keeping means divides a laser beam having the same light frequency into two parts and condenses and radiates the divided laser beam onto one identical point on the recording medium in a common focal point state and at a certain angle, while moving the recording medium in a direction of the angle formed when the divided laser beam is condensed and radiated, and thereby keeping a light frequency difference between the first and second laser beams constant.

According to the above-mentioned method, recorded data is read out from a recording medium by performing a coherent detection for two beams having two different frequencies. As a result, for the reasons described in detail later in the example of the invention, pseudo signal amplification is possible without increasing unnecessary noise components in the amplification using electric circuitry. Hence, according to this method, even in the case where the light intensity power of the signal light per bit is weak, the recorded data can be read out without deteriorating the C/N ratio.

Additionally, by means of a control so as to keep the light frequency difference between two light beams constant, recorded data can be reproduced with high accuracy for the reasons described later in the example of the invention.

Moreover, by radiating two light beams having different light frequencies onto a common focal point onto a recording medium, in the case of reading data from a multi-layered recording medium, the influence of noise light from the layers other than a reading target layer can be eliminated.

Thus, the present invention described herein makes possible the advantages of providing (1) an optical data reading method for highly precisely reading recorded data even in the case where the recording area per bit is reduced and the light intensity of reading signal light is weak, and in the case where the bit reading rate is of a high speed of more than 1 Mbps; (2) in an optical system having a multi-layered recording medium, an optical data reading method capable of precisely reading a signal only from a specific recording medium layer without being affected by other layers; and (3) providing an optical data reading apparatus for use in carrying out the optical data reading methods.

These and other advantages of the present invention will become apparent to those skilled in the art upon reading and understanding the following detailed description with reference to the accompanying figures.

DESCRIPTION OF THE PREFERRED EMBODIMENTS

The examples of the present invention will be described hereinafter, with reference to accompanying drawings.

EXAMPLE 1

Figure 1:
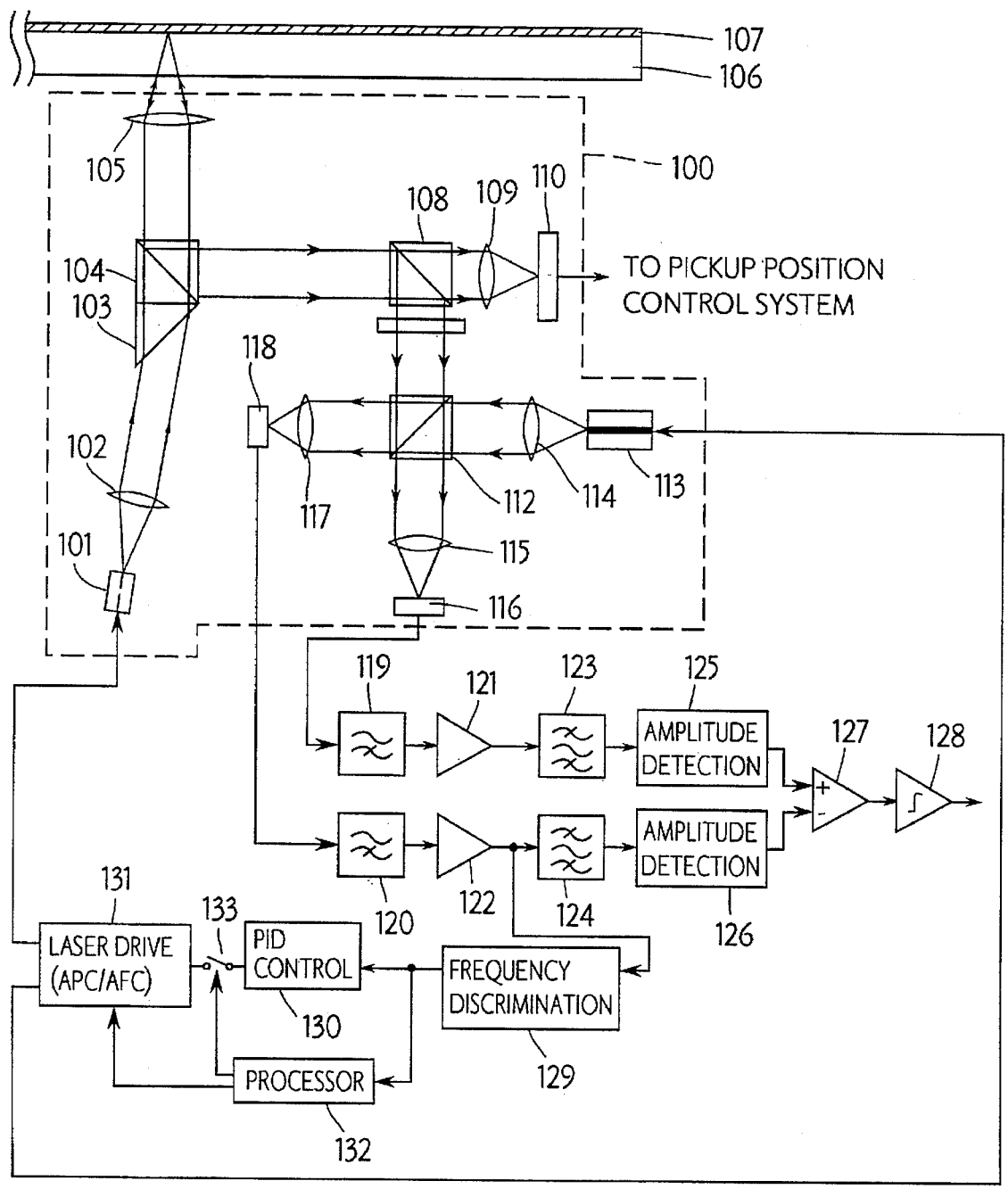
FIG. 1 is a diagram showing a configuration of a system of an optical data reading apparatus to be used in Example 1 of the present invention.

FIG. 1 shows a configuration of a system of an optical data reading apparatus to be used in the method according to the present invention. The configuration and operation of the system will be described hereinafter.

A first laser beam having a frequency of $v_1$, which is linearly polarized light emitted diagonally upwards from a first semiconductor laser element 101, is collimated by a collimator lens 102. The collimated beam is, via a beam shaping prism 103 and a beam splitter 104, incident upon a condenser lens 105. Then, the incident beam is condensed by a condenser lens 105 and is radiated onto a disc 106 located above the condenser lens 105. More specifically, the incident light is condensed and radiated onto a recording medium 107 having magnetooptical effects, which is provided on the upper face side of the disc 106. As described for the conventional optical pickup, data is digitally recorded in the recording medium 107 by magnetizing the recording medium 107 perpendicularly to the surfaces thereof. When the laser beam radiated onto the recording medium 107 is reflected thereby, the plane of polarization of the laser beam is rotated at a certain angle due to a Kerr effect. At this point, the rotation direction of the plane of polarization depends on the direction of magnetization of the data stored in the recording medium 107. Thus, the recorded data can be reproduced by detecting the rotation direction of the plane of polarization of the reflection laser beam.

The reflection laser beam from the recording medium 107 is collimated by the condenser lens 105, and is incident onto the beam splitter 104 so as to be divided into two parts. One part of the laser beam travels along the original passage, while the other part becomes light in a horizontal direction so as to be incident onto a beam splitter 108, wherein it is re-divided into two beams in horizontal and vertical directions.

Via a condenser 109, the reflected laser beam in a horizontal direction is guided to a multi-divided photodiode 110, wherein it is photoelectrically converted. A tracking error/focus error signal, which is an electric signal, is thus obtained. This electric signal is input to an optical pickup position control circuit which is not shown. Based on an input signal, the position control circuit controls the entire laser beam pickup 100 so that the laser beam to be incident onto the disc 106 is focused precisely with respect to the recording medium 107 and is subject to tracking without deviating from the tracks engraved on the disc 106. Namely, the position control circuit performs as a focusing servo and a tracking servo.

In FIG. 1, only a main beam is shown from among the laser beams. However, to the disc 106, the tracking is performed by radiation light constituted of three beams, the main beam and two sub-beams.

On the other hand, the other reflection beam divided by the beam splitter 108 has its plane of polarization thereof being rotated at 45°. Thereafter, by means of a polarization beam splitter 112, the laser beam is divided into two components of which the planes of polarization are perpendicular to each other. Also, it is so arranged that, to the polarization beam splitter 112, a second laser beam having a frequency $v_2$ emitted from a second semiconductor laser element 113 is incident after being collimated by a collimator lens 114 from the face perpendicular to the face on which the reflected beam light is incident. Similar to the reflected laser beam, this second laser beam is divided into two components of which the planes of polarization are perpendicular to each other.

Herein, the second semiconductor laser element 113 and the collimator lens 114 are positioned so that the wavefront of the second laser beam and that of the reflected laser beam are aligned with each other. The necessity of alignment of both laser beams and the accuracy required for the wavefront alignment will be described later.

In addition, the frequency $v_2$ of the second laser beam is controlled so that the difference from the frequency $v_1$ of the reflected light (i.e., $v_1-v_2$) becomes constant, as will also be described in detail later.

The light of the two components divided by the polarization beam splitter 112 are, via condenser lenses 115 and 117, guided to PIN photodiodes 116 and 118, respectively, so as to be photoelectrically converted.

Then, referring to FIG. 2, the relationship in the direction of polarization between the reflected laser beam and the second laser beam incident onto the polarization beam splitter 112 will be described. The polarization division of the incident light by means of the polarization beam splitter 112 will be also described in detail.

Figure 2:
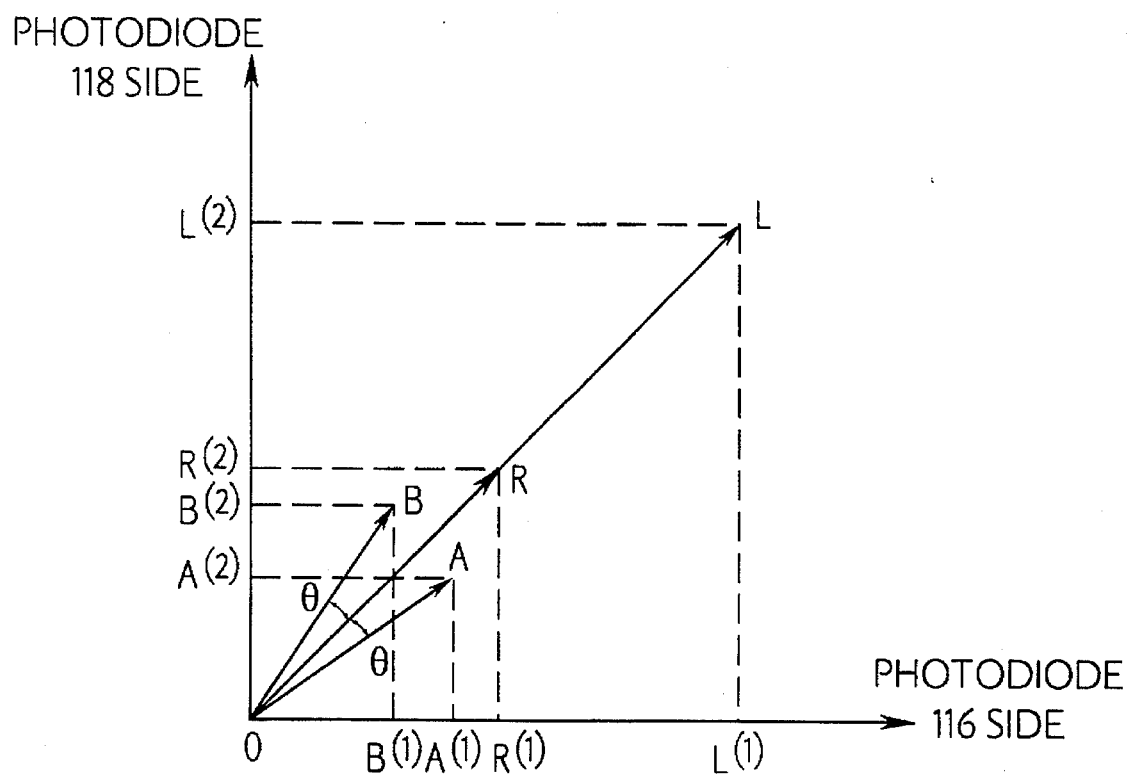
FIG. 2 is a graph showing the relationship of polarization between the first and second laser beams to be mixed at a polarization beam splitter in the optical data reading apparatus of Example 1.

In FIG. 2, the abscissa indicates a polarization component passing through the polarization beam splitter 112 toward the PIN photodiodes 116 (downward direction), whereas the ordinate indicates a polarization component passing through the polarization beam splitter 112 toward the PIN photodiodes 118 (left-hand direction). Also, vectors OR, OA, OB and OL stand for the following:

Vector OR: the beam included within the first laser beam radiated to the disc 106, the beam being reflected without interaction with the recording medium 107, i.e., without rotation of the direction of polarization Vector OA: the reflected laser beam of which direction of polarization is clockwise rotated by the recording medium 107

Vector OB: the reflected laser beam of which direction of polarization is rotated in the direction opposed to that of the vector OA, with the recorded data is inverted Vector OL: the second laser beam emitted from the second semiconductor laser element 113

Herein, the vector OA component and the vector OB component are switched to each other in accordance with "0" and "1" of the digital data stored in the recording medium 107. Consequently, both of the light components do not exist at the same time.

As is apparent from FIG. 2, the positional arrangement of the optical components is arranged so that the polarization directions of the reflected laser beam and the second laser beam are basically at an angle of 45° with respect to the directions in which the light components are divided into two by the polarization beam splitter 112. That is, the light having the polarization components deviating at 45° is controlled so as to have only the component of which the polarization direction is rotated due to a Kerr effect with the recording medium 107. Accordingly, the light received by the PIN photodiode 116 is the vector components on the abscissa shown in FIG. 2, i.e., three vectors $OA^{(1)}$ (or $OB^{(1)}$), $OR^{(1)}$ and $OL^{(1)}$. The laser beam having the two vector components $OA^{(1)}$ (or $OB^{(1)}$) and $OR^{(1)}$ among these three vector components is the reflection light of the first laser beam having a light frequency of $v_1$. On the other hand, the vector component $OL^{(1)}$ is attributed to the second laser beam having a light frequency of $v_2$.

Herein, in the case of employing a so-called coherent detection, in which the wavefronts of two laser beams having different light frequencies are aligned for conversion into an electric signal, the two beams are added to each other as an electric field and thereafter undergo a squaring detection. Now, two light electric fields $E_1$ and $E_2$ of the laser beams are expressed by the following Formulae (1) and (2):

$$E_1 = a_1 \cos(2\pi v_1 t + \phi_1) \quad (1)$$

$$E_2 = a_2 \cos(2\pi v_2 t + \phi_2) \quad (2)$$

Then, a current I photoelectrically converted and output from the PIN photodiode 116 is expressed by the following Formula (3):

$$\begin{aligned} I &= \eta(E_1+E_2)^2 \\ &= \eta/2 \cdot [a_1^2 + a_2^2 + 2a_1a_2\cos\{2\pi(v_1-v_2)t + \phi_1 - \phi_2\}] \end{aligned} \quad (3)$$

where, $\eta$: a proportion constant including the photoelectric conversion efficiency of the PIN photodiode 116 or the like, $a_1$ and $a_2$: electric field amplitudes of the two laser beams, $\phi_1$ and $\phi_2$: light phases of the two laser beams, and t: time.

Herein, the high frequency components to which the PIN photodiode 116 does not substantially respond are averaged $2v_1$, $2v_2$, and $(v_1+v_2)$ components. Also, similar to the normal direct detection, the first and second terms in Formula (3) stand for the sum of DC components in proportion to the intensities of the two laser beams. The third term indicates that an AC component having a light frequency of $(v_1-v_2)$ of the laser beam is included therein. This AC component is peculiar to a coherent detection, and is detected only in the case where the traveling directions of two laser beams are the same, namely, where the wavefronts thereof are aligned, and the frequency difference $(v_1-v_2)$ between the two laser beams is within the range of frequency allowing the PIN photodiode 116 to respond.

Then, the case where two laser beams of the same light frequency but having different light phases are subjected to a light coherent detection will be described. Now, photoelectric fields $E_1$ and $E_2$ of the two laser beams are expressed by the following Formulae (4) and (5), respectively:

$$E_1 = a_1 \cos(2\pi v_1 t + \phi_1) \quad (4)$$

$$E_2 = a_2 \cos(2\pi v_1 t + \phi_2) \quad (5)$$

Then, a current I photoelectrically converted and output from the PIN photodiode 116 is expressed by the following Formula (6):

$$I = \eta(E_1 + E_2)^2 \quad (6)$$
$$= \eta/2 \cdot \{a_1^2 + a_2^2 + 2a_1 a_2 \cos(\phi_1 - \phi_2)\}$$

As is understood from the Formula (6), in this case, in addition to the normal component in proportion to the intensity of the two laser beams, current components appear in connection with the phase difference between the two laser beams. Accordingly, when the relationship in the phase difference between the two laser beams is fixed, this component becomes a DC component, and no AC component is output.

Figure 3A:
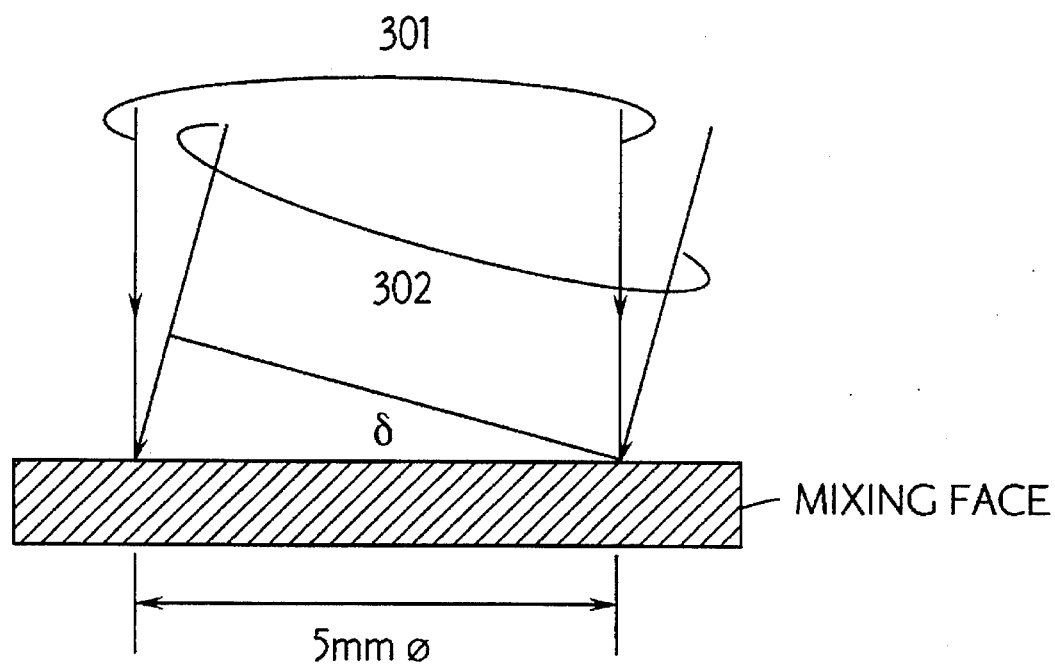
FIG. 3A is a schematic diagram for explaining Example 1, showing the wavefronts in a case where two plane waves are mixed in the state of slight inclination.
Figure 3B:
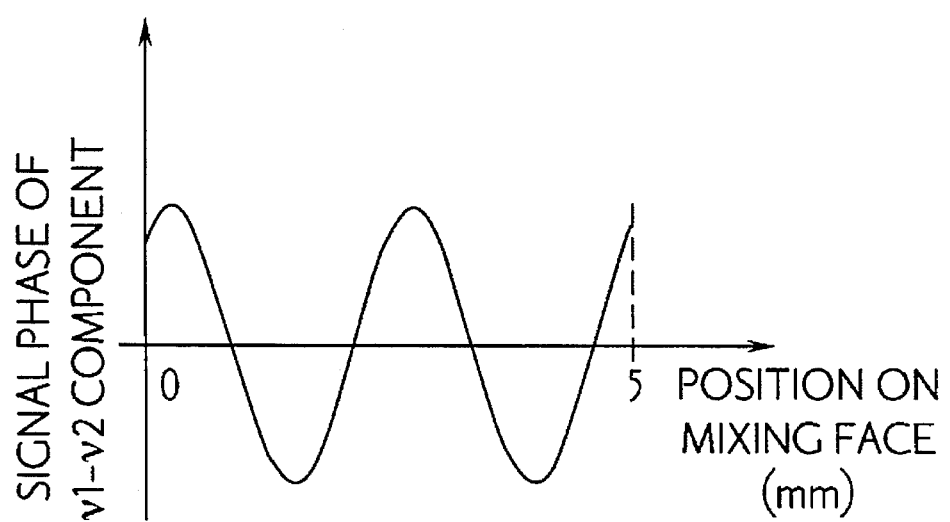
FIG. 3B is an explanatory diagram of Example 1, showing the relationship of the phase of a signal component ($v_1-v_2$) on the mixing face in such a case.

In order that the two laser beams undergo a light coherent detection in the above-mentioned manner, it is important that the wavefronts of the two laser beams are aligned with each other. Now, it is assumed that the two laser beams 301 and 302 having wavefronts deviated from each other by an angle of δ as shown in FIG. 3A are mixed. In this case, the portion in which the signal phase of the component of $(v_1-v_2)$ is inverted in the form of a sine wave as shown in FIG. 3B exists in the mixing face of the beams. For this reason, one inverted portion is offset by another, resulting in an extreme decrease of the amplitude of the frequency component of $(v_1-v_2)$.

In an actual light coherent detection, after being mixed, the laser beams are condensed by a lens so as to be detected by the PIN photodiodes 116 and 118. On the PIN photodiodes 116 and 118, the phase relationship immediately after being mixed is reproduced in the relationship of similarity. This results in the phenomenon similar to that explained for the wavefront of mixed light obtained by mixing plane waves.

Figure 4:
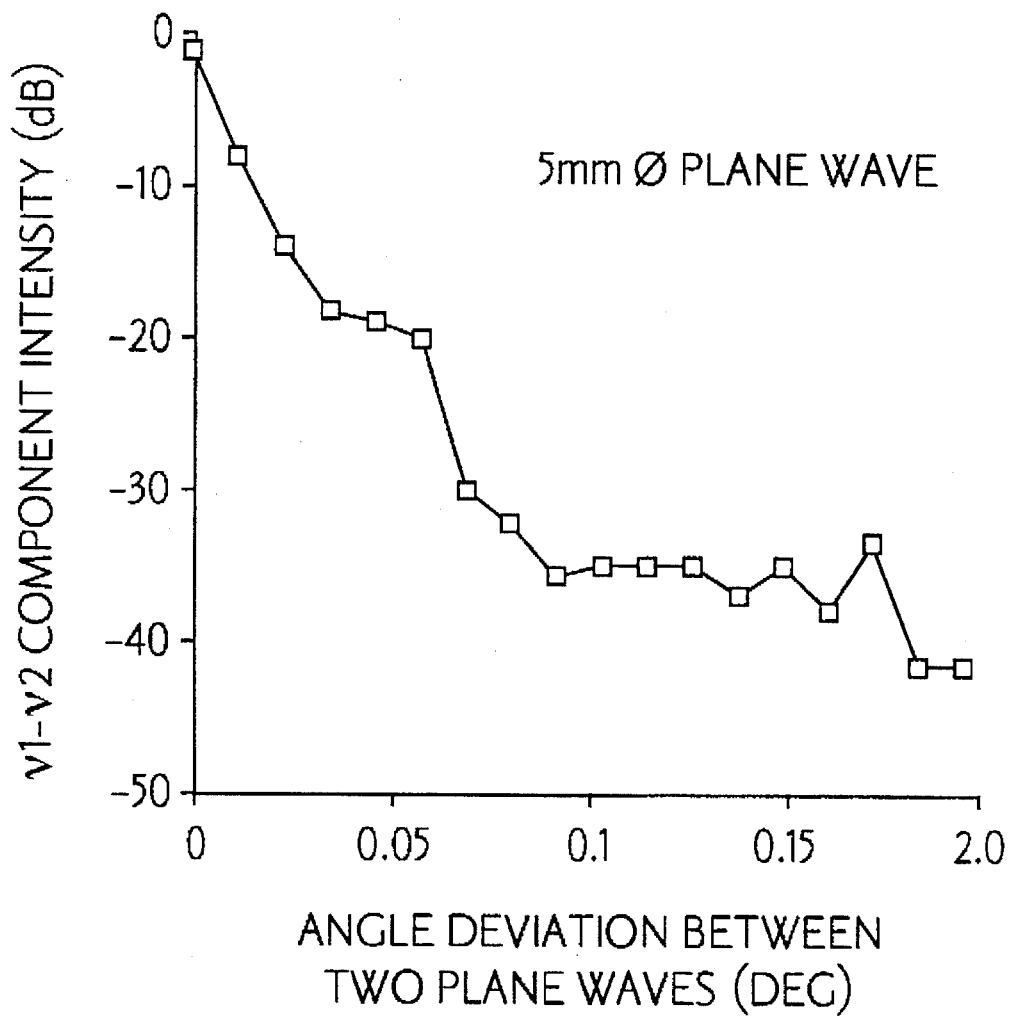
FIG. 4 is a diagram showing the relationship between the wavefront deviation and the beat signal intensity when the two plane waves are subject to a coherent detection, for explaining Example 1.

FIG. 4 is a graph showing the changes in the intensity of a signal component having a frequency of $(v_1-v_2)$ with respect to the angle formed between the wavefronts of two laser beams, in the case where the two laser beams composed of plane waves and each having a diameter of 5 mm are subject to a coherent detection. As shown in FIG. 4, when the wavefronts are deviated from each other at about 0.01°, the intensity of the signal component having a frequency of $(v_1-v_2)$ is attenuated to −10 dB. The accuracy in the wavefront alignment is more strictly demanded as the size of the overlapping portions of the two laser beams become large.

In the data reading apparatus of Example 1, the reflected laser beam from the recording medium and the second laser beam from the second semiconductor laser, to be incident on the polarization beam splitter 112, are both plane waves each having a diameter of 3 mm. Thus, the polarization beam splitter 112, the collimator lens 114, and the semiconductor laser 113 are located so that these two different kinds of beams in the form of plane waves are mixed with each other with an angular accuracy of 0.02° or less, so as to obtain a good and sufficiently strong frequency difference signal as outputs of the PIN photodiodes 116 and 118.

The PIN photodiode 116 of Example 1 performs a light coherent detection for three laser beams as described before. As is understood from the above description, this results in the provision of two outputs as an AC current component: the detection output from the laser beam of the vector $OL^{(1)}$ component and the laser beam of the vector $OA^{(1)}$ (or $OB^{(1)}$) component; and the detection output from the laser beam of the vector $OL^{(1)}$ component and the laser beam of the vector $OR^{(1)}$ component.

Hereinafter, the suffix $^{(1)}$ denotes the vector component in the direction of one of the light vector components of the light divided into two directions by the polarization beam splitter 112, while the suffix $^{(2)}$ denotes the vector component in the direction of the other light vector component.

Now, photoelectric fields of laser beams of the vector $OL^{(1)}$ component, the vector $OA^{(1)}$ component and the vector $OR^{(1)}$ component are expressed by the following Formulae (7), (8) and (9):

$$E_L^{(1)} = a_L^{(1)} \cos(2\pi v_2 t + \phi_L^{(1)}) \quad (7)$$

$$E_A^{(1)} = a_A^{(1)} \cos(2\pi v_1 t + \phi_A^{(1)}) \quad (8)$$

$$E_R^{(1)} = a_R^{(1)} \cos(2\pi v_1 t + \phi_R^{(1)}) \quad (9)$$

Then, the AC component of an output current is expressed by Formula (10):

$$I_{AC}^{(1)} = \eta a_A^{(1)} \cdot a_L^{(1)} \cos\{2\pi(v_1-v_2)t + \phi_A^{(1)} - \phi_L^{(1)}\} + \eta a_R^{(1)} \cdot a_L^{(1)} \cos\{2\pi(v_1-v_2)t + \phi_R^{(1)} - \phi_L^{(1)}\} \quad (10)$$

The two components in the Formula (10) represent signals of the same frequency but each having different phases. This difference of phase is equal to the phase difference between the laser beam of the vector OA component and the laser beam of the vector OR component. These reflected laser beams are generated by the surface of the disc 106 or the surface of the recording medium 107. The laser beam reflected by the disc 106 is not Converted into a parallel beam by the condenser lens 105 but becomes spherical wave diverging light. As a result, the sensitivity thereof is attenuated until it reaches the PIN photodiode 116. In addition, because the light is emitted from the semiconductor laser 113, and the wavefront thereof is not aligned with the wavefront of the second laser beam which is a parallel beam. Accordingly, the diverging light cannot be subject to a light coherent detection. This is because, even if there is some reflection light from the disc 106, it contributes only to the DC components of the output of the PIN photodiode 116. Consequently the laser beam of the vector OA component and the laser beam of the vector OR component are both reflection beams from the recording medium 107, and therefore phases of the two reflected laser beams coincide with each other, satisfying $\phi_A^{(1)} = \phi_R^{(1)}$. Accordingly, by introducing this relationship, the above-mentioned Formula (10) is expressed as the following Formula (11):

$$I_{AC}^{(1)} = \eta(a_A^{(1)} \cdot a_L^{(1)} + a_R^{(1)} \cdot a_L^{(1)}) \cdot \cos\{2\pi(v_1-v_2)t + \phi_R^{(1)} - \phi_L^{(1)}\} \quad (11)$$

Also in the PIN photodiode 118, an output as an AC component is the detection output from the laser beam of the vector $OL^{(2)}$ component and the laser beam of the vector $OA^{(2)}$ (or $OB^{(2)}$), and the detection output from the laser beam of the vector $OL^{(2)}$ component and the laser beam of the vector $OR^{(2)}$ component.

Thus, the AC component of an output current in this case is expressed by the following Formula (12):

$$I_{AC}^{(2)} = \eta(a_A^{(2)} \cdot a_L^{(2)} + a_R^{(2)} \cdot a_L^{(2)}) \cdot \cos\{2\pi(v_1-v_2)t + \phi_R^{(2)} - \phi_L^{(2)}\} \quad (12)$$

Herein, the amplitudes of DC components within current outputs from the PIN photodiodes 116 and 118 are compared with each other, by comparing the above-mentioned Formulae (11) and (12). As shown in FIG. 2, the vector OR and the vector OL are respectively at 45° with respect to the direction of polarization division by the polarization beam splitter 112.

Thus, the relationship expressed by the following Formula (13) is established:

$$a_R^{(1)} = a_R^{(2)} \quad (13)$$

$$a_L^{(1)} = a_L^{(2)} \quad (14)$$

The difference of amplitude components between Formulae (13) and (14) is expressed by the following Formula (15):

$$\Delta = \eta(a_A^{(1)} - a_A^{(2)}) \cdot a_L^{(1)} \quad (15)$$

Herein, where an angle at which the vector OA is rotated from the point of 45° is denoted by θ, the difference in amplitude is expressed by the following Formula (16):

$$\Delta = \eta a_A a_L \sin\theta \quad (16)$$

On the other hand, in the case where the rotation angle of the reflected laser beam subject to a Kerr effect at the recording medium 107 is in the opposite direction, the laser beam of the vector OB component serves as signal light. Hence, where an angle at which the vector OB is rotated from the point of 45° is denoted by θ similar to the case of the vector OA, the difference of amplitude components is expressed by the following Formula (17):

$$\Delta = -\eta a_A a_L \sin\theta \quad (17)$$

For such reasons, it can be judged whether recorded data is "0" or "1", depending on whether the differential of amplitudes of the AC components of the output current subject to a light coherent detection by the PIN photodiodes 116 and 118 is positive or negative.

Furthermore, as is understood from the above description, the signal components corresponding to "0" and "1" signals in the conventional direct detection method are $\pm \eta a_A^2 \sin^2\theta$, whereas the signal components corresponding to "0" and "1" signals in the present invention, to which a light coherent detection is applied, are $\pm \eta a_A a_L \sin\theta$.

In Example 1, the stored data is read from the recording medium arranged so as to have a high-density four times that of the conventional medium, i.e., 1 Mbit/mm². Herein, $a_L$ is a value which can be arbitrarily set by arbitrarily controlling the intensity of light of the second semiconductor laser 113. Meanwhile, even in the case of arranging the recording medium to have a high density, since the light density over the recording medium is required to be constant for restraining the alteration of the recording medium, the intensity of the laser beam condensed and radiated to the face of the disc 106 needs to be, specifically, at about 0.1 mW (where, the output light intensity of the first laser 101 is 4 mW). Accordingly, $a_A \sin\theta$ is in the range from 0.05 μW to 0.2 μW. In the case where the speed of data reading from the disc 103 is set at 0.7 Mbps, substantially at the same degree as that of the conventional one and if the conventional method is employed, a C/N value (from 35 dB to 40 dB) is extremely degraded compared with a C/N value (42 dB) required for the total system including a demodulation circuit. The intensity of the laser beam from the second laser 113 is set at 0.1 mW in the light coherent detection method of Example 1, whereby the C/N value can be improved to be 48 dB. Also, it has been found that the C/N value can be improved to be about 58 dB at maximum by increasing the C/N value up to 10 mW.

Next, an actual operation for signal detection will be described in detail with reference to the accompanying figures. As described above, after two polarization components perpendicular to each other are separately subject to a light coherent detection, high-pass filters 119 and 120 remove the DC components from the electric signals output from the PIN photodiodes 116 and 118. Then, the electric signals from which the DC components are removed are respectively input to preamplifiers 121 and 122, wherein the AC component important as a signal is amplified. Thereafter, narrow-band pass filters 123 and 124, each having its center pass frequency being set at $(v_1-v_2)$, remove noise components from the AC components, and thereby extract only $(v_1-v_2)$ components (hereinafter, referred to as "beat components") expressed by the above-mentioned Formulae (11) and (12). In Example 1, it is so arranged that the difference of light frequency between both laser beams is 1 GHz, the frequency of a beat signal is also 1 GHz. The specific value of light frequency of each of the first and second laser beams and a method for keeping the difference in light frequency $(v_1-v_2)$ constant will be described later.

Figure 5A:
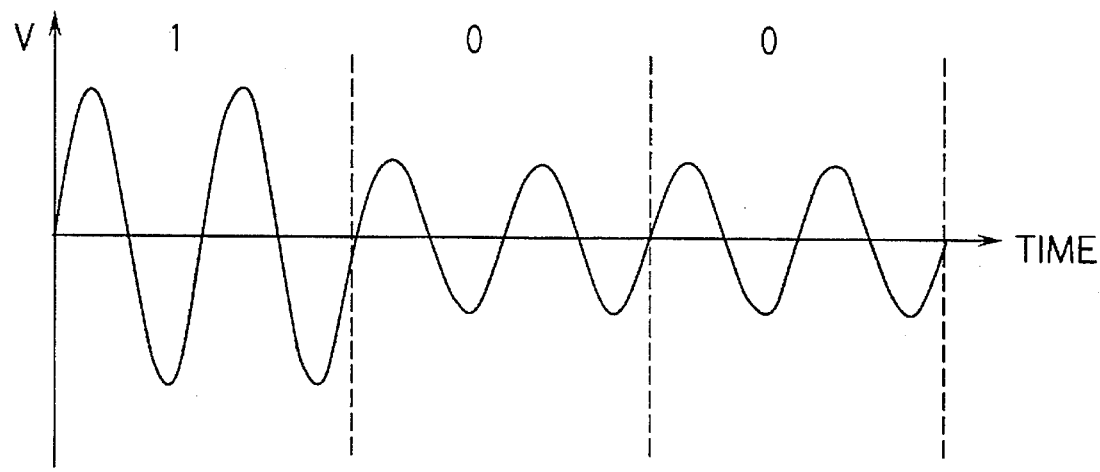
FIG. 5 is a diagram showing an exemplary output signal waveform of a preamplifier of the optical data reading apparatus of Example 1.
Figure 5B:
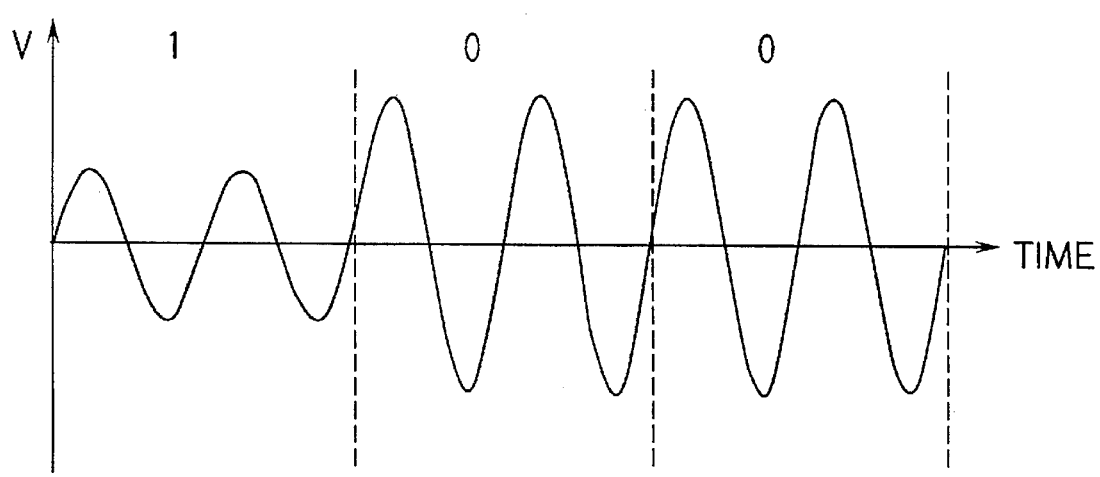

FIG. 5 shows output waveforms of the preamplifiers 121 and 122. As is apparent from this figure, the amplitude of an output beat signal of each of the preamplifiers 121 and 122 is alternately changed, depending on whether the amplitude of a recording signal is "1" or "0". Also, as is shown in FIG. 5, the amplitude of a beat signal from the preamplifier 121 is large in the case where the recording signal is "1", while the amplitude of a beat signal from the preamplifier 122 is large in the case where the recording signal is "0". This form of a signal stands for a signal transmission method by means of an amplitude shift keying (ASK) modulation, which is a differential type ASK using two channels.

Accordingly, in order to demodulate the recording signal, it is necessary to make the beat signal frequency sufficiently higher than a digital data reading rate R (R=0.7 Mbps, in Example 1). However, in reality, it is required to set the beat signal frequency to at least more than double that of the digital data reading rate R, preferably, more than 10 times.

Also, in the conversion of an electric signal by the ASK modulation method, it is advantageous in that the reproduction of the signal is assured even if the frequency and phase of a carrier wave (i.e., a beat signal) are relatively unstable. Unlike normal wireless communication, in Example 1, the width of a spectrum line of the semiconductor laser itself is 1 MHz. The disc fluctuates due to variations in the value of $(v_1-v_2)$ and rotational movements of the disc 106 having digital data. As a result, changes in the value of $\phi_A^{(1)}$ or $\phi_A^{(2)}$ make the frequency and phase of the beat signal unstable. Consequently, the method of reproducing digital data from the signal once converted into the ASK modulation method, as in Example 1, is preferable.

In the above-mentioned manner, the amplitude value of the beat component passed through the narrow-band pass filters 123 and 124 is detected as a DC voltage by amplitude detection circuits 125 and 126 of an asynchronous type, such as a full wave rectifier. Successively, the amplitude value of the beat component, converted into a DC voltage component, is differential-amplified. Finally, by a signal level comparison circuit 127, it is judged whether an output from a differential amplifier circuit 127 is positive or negative. The result of this judgement allows it to decide whether the signal component corresponds to recorded data "1" or "0", respectively expressed by Formula (16) or (17), is positive or negative. Thus, the recorded data can be read out.

At this time, in order to assure a C/N value sufficient for reading the signal, restraint of a noise level is required in addition to the amplification of the signal component by a light coherent detection. Hence, in configuring a detection system of Example 1, the following two points are especially taken into consideration:

(1) Amplifiers having low noise index characteristics, e.g., a GaAs high electronic transfer transistor, are used as the preamplifiers 121 and 122.

(2) The pass-band width of each of the narrow-band pass filters 123 and 124 is set to be as short as possible.

This pass-band width is rate-determined by the sum of the width of short term/long term fluctuation of the beat signal frequency and the data reading speed. In Example 1, the width of the fluctuation of the beat signal frequency is determined based on the width of the spectral line emitted from each of the semiconductor laser elements 101 and 113. Since the data reading speed is 0.7 Mbps, the pass-band width of each of the narrow-band pass filters 123 and 124 is set at 3 MHz.

Next, a means for keeping the difference in light frequency of $(v_1-v_2)$ (beat signal frequency) between the first laser beam from the semiconductor laser element 101 and the second laser beam from the semiconductor laser element 113 constant (Automatic Frequency Control: AFC) will be described. The laser beam having a wavelength of about 780 nm and a light frequency of about 385 THz is used for both the first and second lasers 101 and 113 of Example 1. As is commonly known, the oscillation wavelength of a semiconductor laser is easily changed in a range of several millimeters due to the temperatures of the laser element. The light frequency changes depending on such a change in the range of about 3 THz. Accordingly, it is very difficult to stabilize the light frequencies $v_1$ and $v_2$ of the respective laser beams as well as to keep the light frequency difference of $(v_1-v_2)$ at 1 GHz. Hence, in order to keep the light frequency difference of $(v_1-v_2)$ at 1 GHz, a method of controlling the light frequency $v_2$ of the second laser beam to follow the change in the light frequency $v_1$ is employed with a difference of 1 GHz being kept therebetween, without stabilizing the light frequency $v_1$ of the first laser beam itself. The specific configuration thereof will be described hereinafter. The PIN photodiode 118 performs a light coherent detection, and a beat signal component extracted from an electric output thereof by the high-pass filter 120 and the preamplifier 122 is input to the narrow-band pass filter 124. At the same time, it is input to a frequency discrimination circuit 129, and the frequency of an AC component is detected as a voltage value. Asynchronous detection, having a wide detection band and not requiring much time in synchronization, is suitable for this frequency discrimination circuit 129. In Example 1, a delay detection circuit is used as the frequency discrimination circuit 129.

Next, a PID control circuit 130 generates a control signal so that the output of the frequency discrimination circuit 129 is equal to a predetermined set voltage (not shown) input from outside. In accordance with this control signal, the driving conditions of the first and second semiconductor laser elements 101 and 113 are changed, or controlled by a laser drive circuit 131. At the same time, the laser drive circuit 131 controls light outputs from both the first and second semiconductor laser elements 101 and 113 (i.e., an Automatic Power Control: APC), in accordance with a control signal from an automatic power control circuit system (not shown) which is provided separately. Furthermore, in Example 1, laser elements of a wavelength variable type are used as the semiconductor laser elements. The light intensity and the light frequency of the laser beam emitted therefrom are controllable by respectively provided control terminals. Thus, it is confirmed that the difference in light frequency and the beat signal frequency can be kept constant by providing such a feedback circuit system. That is, even when the light frequency $v_1$ of the first laser beam has a change of about 3 THz, which is caused by temperature changes or the like, in the vicinity of 385 THz, the light frequency difference of $(v_1-v_2)$ is able to be maintained at a constant value of 1 GHz, by controlling the operational conditions of the second laser element by using the above-mentioned feedback control circuit.

Next, a means for setting the light frequency difference in the initial state will be described. In the initial state, normally, the first and second semiconductor laser elements 101 and 113 emit laser beams having light frequencies that are irrelevant to each other. Hence, in the initial state, it is impossible to carry out the control by the above-mentioned feedback circuit. Only after the disc 106 is set and a focus servo is started, the reflection light from the disc 106 reaches the PIN photodiode 118 End it becomes possible to perform a light coherent detection. In this state, since the light frequencies of both of the laser beams are largely different from each other, the light frequency difference is of a high frequency which is out of the response band of any of the PIN photodiode 118, the highpass filter 120, the preamplifier 122 and the frequency discrimination circuit 129. Consequently, the output voltage of the discrimination circuit 129 becomes 0 V.

In this state, first, while the drive conditions of the first semiconductor laser element 101 are kept unchanged, the output voltage of the discrimination circuit 129 is monitored and the light frequency of the second semiconductor laser element 113 is gradually scanned in one direction. Such a series of operations is controlled by a processor circuit 132 monitoring the output voltage of the discrimination circuit 129. At this time, a switch circuit 133 for connecting and disconnecting between the PID control circuit 130 and the laser drive circuit 131 is in an OFF state. Accordingly, the PID control circuit 130 is cut off from the laser drive circuit 131. Hence, in this state, the feedback circuit does not operate.

Moreover, when continuing to scan the light frequency of the second laser beam emitted from the second semiconductor laser element 113, the light frequency of the second laser beam is close to that of the first laser beam at a certain point. At this time, the light frequency difference falls within the response speed bands of the PIN photodiode 118, the high-pass filter 120, the preamplifier 122 and the frequency discrimination circuit 129. Thus, a positive output voltage is output to the frequency. discrimination circuit 129. Meanwhile, the step of light frequency scanning by the second laser beam is required to be smaller than the comprehensive response band of the above-mentioned circuit systems 118, 120, 122 and 129. So, in Example 1, the response band is set at 1 MHz.

Then, when a processor circuit 132 judges that the output voltage from the frequency discrimination circuit 129 falls within a certain range allowing this feedback circuit to sufficiently function, the processor circuit 132 turns a switch circuit 133 ON so as to activate the PID control circuit 130, whereby the control condition is switched into the feedback circuit control.

A sufficient C/N value is ensured in a light coherent detection of Example 1 by employing such a circuit configuration, even if a C/N value sufficient for realizing a practical bit error rate is not assured in the reproduction by the direct detection method due to decrease of power per bit of reflection laser beam (corresponding to the vector OA component and the vector OB component in Example 1) as pointed out before as a problem of the conventional technique. Hence, such a circuit configuration allows the reading apparatus to deal with the disc memory of a high density performing a high-speed access. The value of the practical bit error rate is generally $10^{-4}$ to $10^{-5}$, though it changes depending on the significance or redundancy of the data.

When the data stored in a disc having a recording density of 1 Mbit/mm$^2$ by using the apparatus of Example 1, the bit error rate of $10^{-6}$ is obtained. This is the results of providing a means for generating the second laser beam inside the apparatus, performing a light coherent detection allowing the amplification of pure signal components excluding the amplification of noise components by the photoelectric field amplitude of the second laser beam, and reading/ reproducing the recorded data as an ASK modulation signal using the beat signal frequency as a sub carrier.

EXAMPLE 2

The optical data reading apparatus of Example 2 will be described hereinafter.

Figure 6:
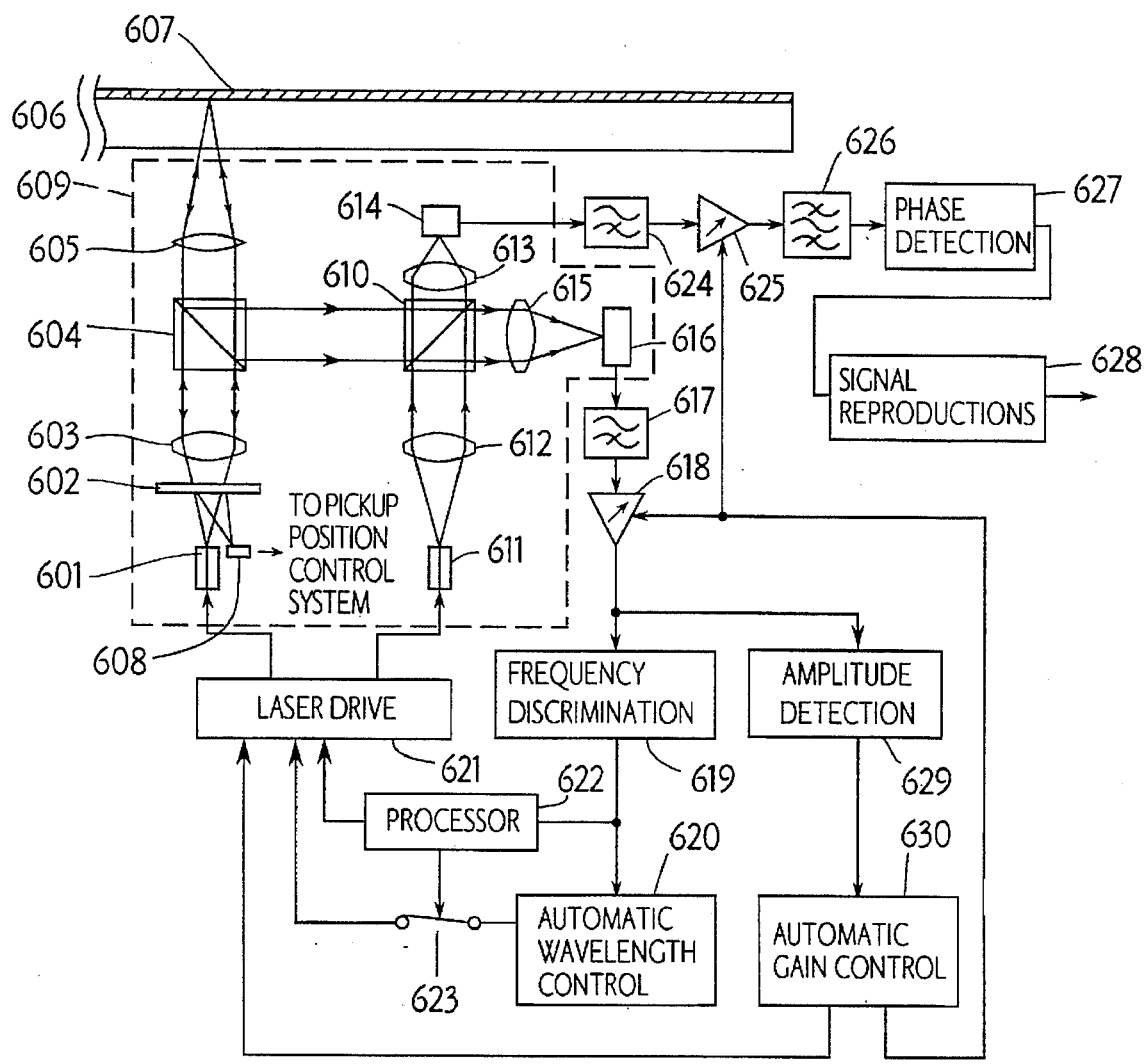
FIG. 6 is a diagram showing a configuration of an optical data reading apparatus of Example 2.

FIG. 6 is a diagram showing a schematic configuration of the optical data reading apparatus of Example 2. The first laser beam emitted from a first semiconductor laser element 601 is, through a hologram plate 602, converted into a plane wave by a collimator lens 603. Since the wavelength of the first laser beam from the first semiconductor laser element 601 is set at 785 nm, the light frequency $v_1$ thereof is about 382 THz. The first laser beam converted into a plane wave passes through a beam splitter 604, condensed by a condenser lens 605 and radiated onto a recording medium 607 formed on an optical disc 606. Due to the Kerr effect similar to Example 1, the reflected first laser beam is rotated in the opposite direction corresponding to "0" and "1" of the recorded digital data.

The laser beam reflected by the recording medium 607 is converted into a plane wave by the condenser lens 605 again and divided into two parts by the beam splitter 604. The reflected laser beam travelling straight through the beam splitter 604 is condensed by the collimator lens 603 and diffracted by a hologram formed on the hologram plate 602. The diffracted beam is radiated to a multi-divided photodiode 608 disposed in the vicinity of the first semiconductor laser element 601. This diffracted beam is used for detecting the focus condition and the tracking condition of the radiated laser beam on the optical disc 606. An output from the multi-divided photodiode 608 is input to a (not shown) pickup position control circuit system. By means of an actuator, the pickup position control circuit system operates an optical pickup 609 constituted of an entire optical system enclosed by dotted lines in FIG. 6, for keeping the focus and tracking conditions unchanged.

Figure 7:
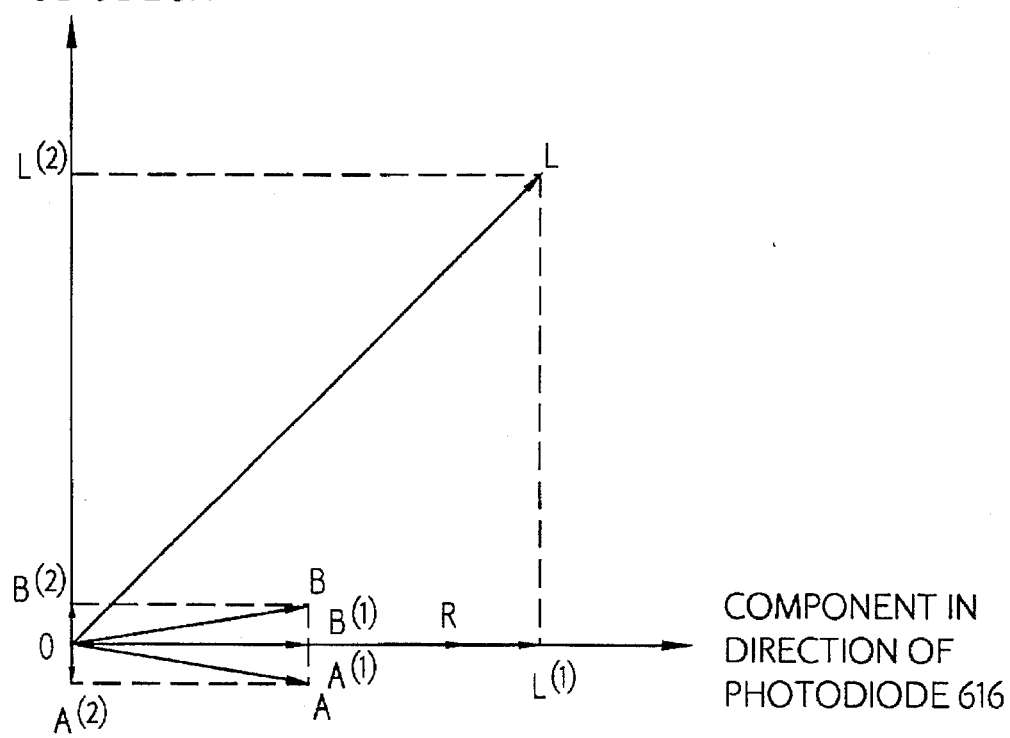
FIG. 7 is a graph showing the relationship of polarization between the first and second laser beams to be mixed at a polarization beam splitter in the optical data reading apparatus of Example 2.

One of the two parts divided by the beam splitter 604, of which the optical path is turned at right angles, is divided by a polarization beam splitter 610 into two components perpendicular to each other. The condition at this time is shown in FIG. 7. Similar to Example 1, a vector OA (or OB) represents a reflected laser beam including a signal component of which plane of polarization is rotated due to a Kerr effect, while a vector OR represents a laser beam reflected without interaction with the recording medium 107, i.e., without being subject to a Kerr effect.

To the polarization beam splitter 610, together with these two reflected laser beams, a laser beam having a light frequency $v_2$ (about 382 nm) and emitted from a second semiconductor laser element 611 is also incident. This second laser beam is converted into a plane wave by a collimator lens 612 and thereafter is incident onto the polarization beam splitter 610. As is shown by the vector OL in FIG. 7, the plane of polarization of the second laser beam is at 45° with respect to the polarization division direction of the polarization beam splitter 610. The control of the plane of polarization at this time is performed by locating the second semiconductor laser element 611 so as to be rotated by 45° around the optical axis. The reflected laser beam and the second laser beam are mixed by the polarization beam splitter 610, both in the form of plane waves. At this time, the beam spot radius of both of the plane waves is 2 mm. Furthermore, the second semiconductor laser element 611 and a collimator lens 615 are fixed with an accuracy of 0.03° or less, and controlled so that the wavefronts of these two laser beams are aligned with each other with an accuracy of 0.03° or less. This makes it possible to efficiently detect beat signals from both of the laser beams, as described with reference to FIGS. 3 through 5.

The respective groups of light beams with their polarization components being divided by the polarization beam splitter 610 are incident onto the photodiodes 614 and 616 by means of the collimator lenses 613 and 615, respectively, so as to be subject to a light coherent detection.

In FIG. 7, the abscissa indicates a group of beams travelling in the direction of the photodioide 616, while the ordinate indicates a group of beams travelling in the direction of the photodioide 614. At the photodioide 616, a beam having a light frequency $v_1$, which is represented by the vectors OR and OA$^{(1)}$ (or OB$^{(1)}$) and is the reflection light of the first laser beam, and the second laser beam having a light frequency $v_2$, which is represented by the vector OL$^{(1)}$, are subject to a light coherent detection. The AC component (beat signal) is generated by the vectors OA$^{(1)}$ (or OB$^{(1)}$) and OL, and by the vectors OR and OL. Herein, it is determined whether the light of the vector OA or that of the vector OB is reflected, depending on whether the recorded data is "0" or "1". However, in either case, the light having the same vector component (vector OA$^{(1)}$=vector OB$^{(1)}$) reaches the abscissa of FIG. 7. In other words, the beat signal component included in the output current from the photodiode 616 is expressed by the following Formula (18):

$$I_{AC}{}^{(1)}=\eta(a_A{}^{(1)}+a_R)a_L{}^{(1)} \cos\{2\pi(v_1-v_2)t+\phi_A{}^{(1)}-\phi_L{}^{(1)}\} \qquad (18)$$

The amplitude thereof becomes constant irrespective of whether the recorded data is "0" or "1". However, for the same reasons as those in Example 1, it is assumed that the light phases of the vector OA (or OB) component light and the vector OR component light coincide with each other.

On the other hand, on the side of the photodiode 614, two laser beams, i.e., the vector OA$^{(2)}$ (or OB$^{(2)}$) component light having a first light frequency $v_1$ and the second laser beam having a second light frequency $v_2$ and represented by the vector OL$^{(2)}$ component light are subject to a light coherent detection. The beat signal component included in the output current from the photodiode 614 is expressed by the following Formula (19):

$$I_{AC}^{(2)} = \eta a_A^{(2)-i} a_L^{(2)} \cos\{2\pi(\nu_1-\nu_2)t+\phi_A^{(2)}-\phi_L^{(2)}\} \quad (19)$$

Figure 8:
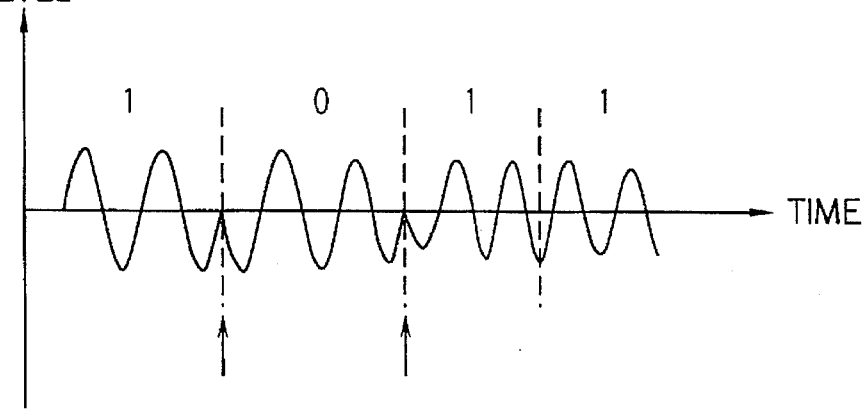
FIG. 8 is a diagram showing an exemplary output signal waveform of a preamplifier of the optical data reading apparatus of Example 2.

In this case, the relationship of vector $-OA^{(2)}$=vector $OB^{(2)}$ is satisfied, and every time the recorded data is switched between "0" and "1", the phase of the beat signal output from the photodiode 614 is inverted at 180°. This corresponds to two phase shift keying (2PSK) in which the signal modulation is performed by causing "1" or "0" of the recorded data to correspond to either of two phase conditions, as shown in FIG. 8.

As described above, from the photodiode 614, the beat signal modulated by 2PSK, of which phase is inverted depending on whether the recorded data is "1" or "0", is output. On the other hand, from the photodiode 616, the beat signal having a constant amplitude irrespective of whether the recorded data is "1" or "0" is output. Thus, the output of the photodiode 614 is used for signal reproduction, while the output of the photodiode 616 is used for feedback control keeping the light frequency difference between the first and second laser beams constant. This will be described in detail hereinafter.

The feedback control for keeping the light frequency difference constant will be described hereinafter. First, from the output of the photodiode 616, AC components are removed by a high pass filter 617. Thereafter, only the beat signal component is amplified by a gain variable preamplifier 618. The output of the preamplifier 618 is divided into two parts, one of which is input to a frequency discrimination circuit 619. The frequency discrimination circuit 619 causes a DC voltage corresponding to the beat signal frequency to be generated, and outputs a control signal so that this discrimination voltage is equal to the set voltage separately input from an automatic wavelength control circuit 620. The driving conditions of the two laser elements are changed by a laser drive circuit 621 in accordance with this control signal, whereby the light frequency difference between two laser beams is kept constant.

In addition, the control of the light frequency difference in the initial state is realized by a processor circuit 622 and a switch circuit 623, similar to Example 1. However, in Example 2, wavelength stabilizing laser elements (of distributed feedback laser element type) each having only a single terminal are used as the first and second semiconductor laser elements 601 and 611. So, the temperatures of the semiconductor laser elements 601 and 611 are changed for varying the respective light frequencies of the laser beams. In order to change the temperatures, a resistance body provided in the vicinity of the semiconductor laser elements 601 and 611 is used for heating. In Example 2, it is necessary to control the two semiconductor laser elements 601 and 611. Hence, while the light frequency of one semiconductor laser element constant is fixed, the light frequency of the other semiconductor laser element is scanned in a certain direction, whereby the desired light frequency difference is realized. Meanwhile, in the case where the desired light frequency is not realized by the light frequency scanning of the other semiconductor laser element alone, while the driving conditions of the semiconductor laser element initially subject to the light frequency scanning are maintained in the scanning accomplished state, the light frequency of the other semiconductor laser element is scanned in the direction opposite to that of the initially performed light frequency scanning. Thus, the laser elements are controlled so as to obtain the desired light frequency difference (the beat signal frequency). The technique similar to the above-mentioned control of light frequency, realized by utilizing the temperature of the semiconductor laser element, is described in Japanese Laid-Open Patent Publication Nos. 4-134937 and 4-134938. The disclosure of these documents are incorporated by reference.

Next, the operations for reading/reproducing the recorded data will be described. The output from the photodiode 614 is fed to a highpass filter 624 where the DC components are removed. Then, only the beat signal component is amplified by a gain variable preamplifier 625. The amplified beat signal is fed to a narrow-band pass filter 626, where the noise other than the beat signal frequency component is removed. The center frequency of the passband of the narrow-band pass filter 626 is arranged to be equal to the beat signal frequency $(\nu_1-\nu_2)$, and set at 2 GHz in Example 2. That is, as described for Example 1, it is necessary for the beat signal frequency, which is 5 Mbps here, to be of a sufficiently high frequency with respect to the data reading rate.

Furthermore, the passband width of the narrow-band pass filter 626 is required to be selected equivalently to the sum of the frequency fluctuation width of the beat signal and the transfer rate of the reading data, and is set at 8 MHz. This value is thus determined since the spectral line width of the laser beam output from the semiconductor laser elements 601 and 611 is 0.4 MHz. The data reading rate is set at 5 Mbps. The output signal waveform of the narrow-band pass filter 626 is in the shape of 2PSK modulation waveform having a beat signal shown in FIG. 8 as a carrier.

With respect to the beat signal passed through the narrow-band pass filter 626, the phase state inverted by 180° is output as a positive/negative voltage by a phase detection circuit 627. As the phase detection circuit 627 in this case, a delay detection circuit employing an asynchronous detection method is used. As this circuit, a circuit conventionally used for wireless communication may be normally usable. Such a circuit is described in detail in Chapter 5 of "Digital Communication Circuit" edited by Kuroyanagi (published by Sangyotosho, in 1990).

The actual optical disc 606 rotates at a high-speed, which makes the beam radiation face of the recording medium 607 oscillate. So, the value of $\phi_A^{(2)}$ in Formula (19) changes in accordance with this oscillation. In general, the relative oscillation amplitude of the optical disc face with respect to the pickup is several μm, which is larger than the wavelength of light (785 nm). As a result, the value of $\phi_A^{(2)}$ varies over a range of 1000° or more. This oscillation of the disc 606 does not permit reproduction of a signal if the speed at which the beat signal frequency changes per 180° is equal to or more than the data reading rate (5 Mbps). That is, the phase change caused by oscillation of the disc 606 cannot be discerned from the phase change caused by the inversion depending on "0" or "1" of the recorded data. In Example 2, in order to prevent such a condition, the following countermeasure is provided:

(1) A lens having a large numerical aperture, i.e., with a shallow focal depth, is used as the condenser lens 605, so that a focus error to the extent of a quarter of the wavelength of the first laser beam can be detected. In addition, a focus servo system is more fully equipped, for example, by employing a high-speed response type actuator as an actuator of the focus control of the optical pickup 609 so as to lower the relative oscillation frequency between the disc and the pickup (2 MHz or less).

(2) In the phase detection circuit 627, the output of a normal PLL detection circuit is filtered through a narrow-band pass filter (not shown) having a passband ranging from the value equivalent to the reading error rate (5 MHz) to that equivalent to the double of the same (10 MHz). Only the voltage conversion corresponding to the amount of phase change existing within this band is subject to the detection.

By adopting such an arrangement, a signal such that the voltage correspondingly changes at the time of inversion of the reading data between "0" and "1" is output from the phase detection circuit 627. Finally, a signal reproduction circuit 628 reproduces a recorded signal on the basis of this signal.

In Example 2, the intensity of laser light output from the second semiconductor laser element 611 and the gains of the preamplifiers 618 and 625 are controlled by a feedback circuit system so that the amplitude of the signal input to the phase detection circuit 627 is kept constant. In such a case, by the amplification by electronic circuits (i.e., preamplifiers 618 and 625), various noises arising in the circuits in the periphery of the photodiodes 614 and 616 and in the high pass filters 617 and 624 are also amplified. Additionally, in practical use, excessive noises necessarily occur in the preamplifiers 618 and 625. On the other hand, in the case of a light coherent detection, the signal amplitude can be amplified without making the noise increase. Accordingly, it is preferable that the function of a light coherent function are utilized to the maximum extent.

A specific configuration employed in Example 2 will be described. An output from the above-mentioned preamplifier 618 is input to the frequency discrimination circuit 619, and at the same time, fed to an amplitude detection circuit 629 where the beat signal amplitude is detected as a DC voltage. The value of this voltage is input to an automatic gain control circuit 630. The automatic gain control circuit 630 compares the input voltage value and a set voltage value separately applied from the outside, and outputs a control signal so that these values are equal to each other. This control signal is input to the laser drive circuit 621 and the preamplifiers 618 and 625. In accordance therewith, the intensity of the second laser beam of the second semiconductor laser element 611 and the gains of the two preamplifiers 618 and 625 are changed.

By means of this feedback circuit system, the amplitude of the beat signal output from the preamplifier 618 is kept constant. Equivalently, the amplitude of the beat signal output from the preamplifier 625 is also kept constant. As the principle of the control in this case, it is important that the intensity of the laser beam output from the second semiconductor laser element 611 is increased to the largest extent possible, and thereby priority is given to the pseudo amplification of the amplitude of the beat signal performed by a light coherent detection. So, the amplification by the preamplifiers 618 and 625 is used only when the intensity of the laser beam output from the second semiconductor laser element 611 cannot be increased due to the structural output limit of the semiconductor laser element 611, the restriction of the intensity of the light to be input to the photodiodes 614 and 616, and the like.

By thus carrying out a light coherent detection, as expressed in the Formula (19), the amplitude of the beat signal from the photodiode 614 has the form in which the amplitude is pseudo-amplified by electric field amplification of the second laser beam. Hence, even in the state that the signal light power per bit is lowered, a high C/N value is obtainable. Furthermore, in addition to the pseudo-amplification by virtue of a light coherent detection, in Example 2, the beat signal subject to a light coherent detection has become a 2PSK modulation signal using a beat signal frequency as a career as shown in FIG. 8. So, more advantageously, even if a C/N value is considerably low, the signal can be reproduced at a relatively high bit error rate. For example, in comparison with the ASK method in Example 1 and the 2PSK method in Example 2, a C/N value necessary for realizing a bit error rate of $10^{-4}$ is as follows:

ASK (amplitude detection): 15 dB

2PSK (delay detection): 9.4 dB

More detailed information is described in the above-mentioned "Digital Communication Circuit".

As is apparent from this comparison, by using the 2PSK method, a signal having a C/N value lower than that of the ASK method by 5.6 dB can be reproduced at a bit error rate of $10^{-4}$. However, in comparison with the ASK modulation method, it is more strictly required that the frequency and phase of the beat signal serving as a carrier are stable. Accordingly, as a counter-measure, Example 2 has arrangements so that an element having a narrow spectral line width (0.4 MHz) is used as the semiconductor laser elements 601 and 611, and that the fluctuation component $\phi_A^{(2)}$ as mentioned above is restrained. In such a situation, data reading is actually performed at a reading rate seven times (5 Mbps) higher than that of the conventional one, from a disc of a storage density fourth times (1 Mbit/mm$^2$) higher than that of the conventional one. As a result, with respect to a C/N value of 42 dB of the total system including a demodulation circuit necessary for realizing a bit error rate of $10^{-6}$, a C/N value of 45 dB is realized in the system of Example 2 by making the intensity of the second laser beam 5 mW, while only a C/N value of 27 to 32 dB is obtained in the conventional one. This makes it possible to realize a high-speed reading from a high density recording medium at a bit error rate of $10^{-6}$.

EXAMPLE 3

The optical data reading apparatus of Example 3 will be described hereinafter.

A recording medium using magnetooptical effects is described for the above-mentioned Examples 1 and 2. In Example 3, the recording medium using scattering effects of light is used (similar to an ordinary compact disc).

Figure 9:
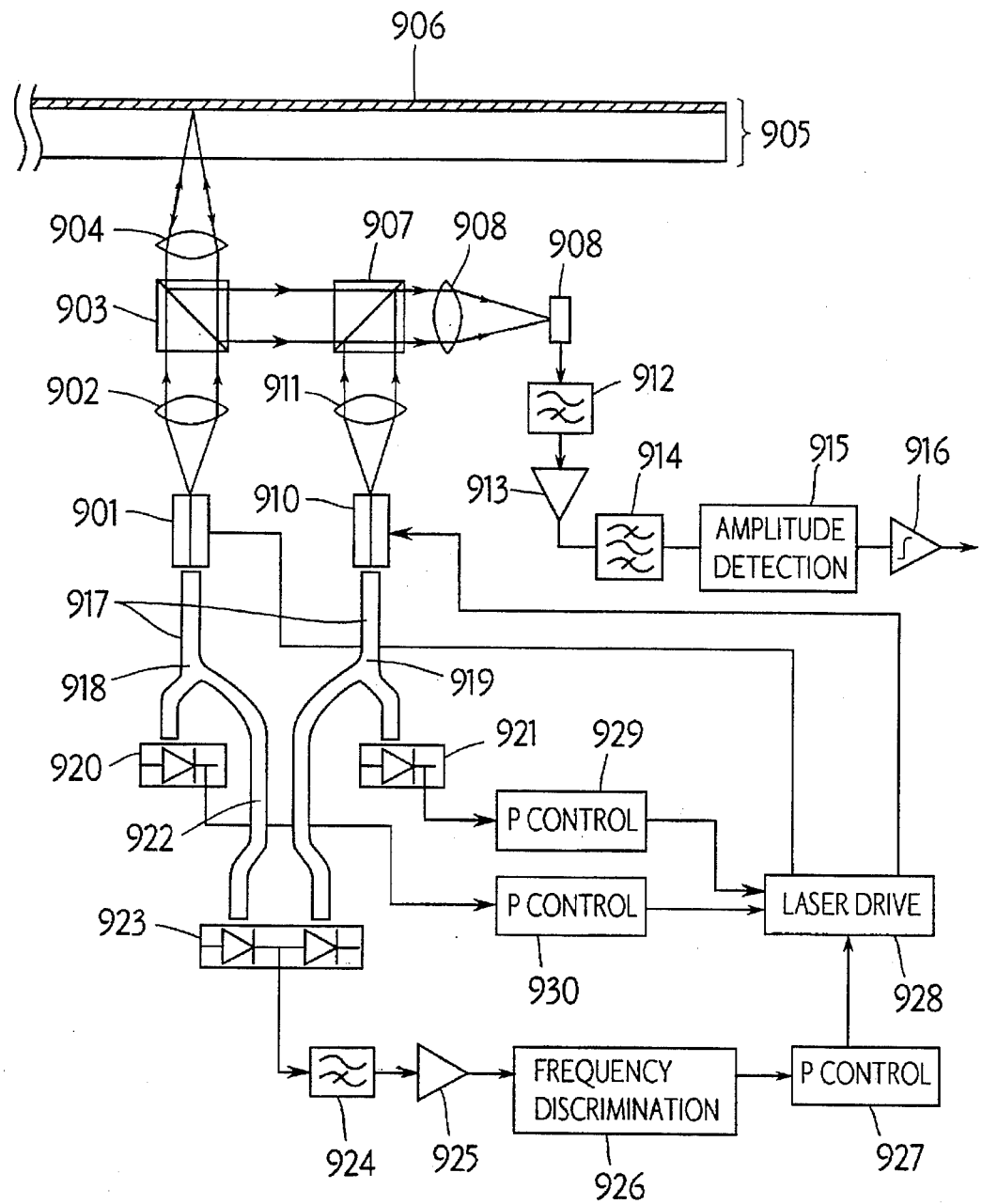
FIG. 9 is a diagram showing a configuration of an optical data reading apparatus of Example 3.

FIG. 9 shows the schematic configuration of the optical data reading apparatus of Example 3. A first laser beam having a wavelength of 635 nm and a light frequency $v_1$: about 472 THz, emitted from a semiconductor laser element 901, is converted into a plane wave by a collimator lens 902. The converted beam passes through a beam splitter 903 and is radiated onto an optical disc 905 by a condenser lens 904. A recording medium 906, on which data is recorded as a presence/non-presence of a pit, is provided on the optical disc 905. The first laser beam is focused on this recording medium 906 so as to form a minimum light spot. The first laser beam reflected by the recording medium 906 (hereinafter, referred to as "signal light") is converted into a plane wave again by the condenser lens 904. The optical path of this beam is turned at right angles by the beam splitter 903. Thereafter, the light beam is incident onto a beam splitter 907.

On the other hand, a second laser beam having a wavelength of 635 nm and a light frequency $v_2$: about 472 THz (the second laser beam being arranged by the below-mentioned system so as to be slightly different from the frequency $v_1$ of the first laser beam only by a certain frequency), emitted from a second semiconductor laser element 910, is converted into a plane wave by a collimator lens 911. Thereafter, the second laser beam is mixed with the signal light incident onto the beam splitter 907. The signal light and the second laser beam mixed at the beam splitter 907 are both plane waves, and the beam spot radius thereof is 1 mm. The beam splitter 907 for mixing the both beams, the second semiconductor laser element 910 and the collimator lens 911 can align the wavefronts of these two beams with an angular accuracy of 0.05°, thus realizing the efficient detection of a beat signal from both of the beams.

Figure 10:
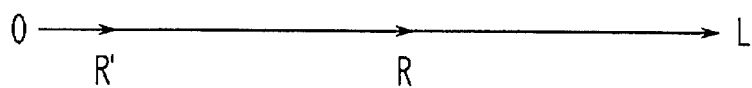
FIG. 10 is a graph showing the relationship of polarization between the first and second laser beams to be mixed at a polarization beam splitter in the optical data reading apparatus of Example 3.

The laser beams mixed by the beam splitter 907 are condensed by a condenser lens 908 and guided to a photodiode 909. A high pass filter 912 removes DC components from the output of the photodiode 909. Thereafter, only the beat signal is amplified by an amplifier 913. The relationship of the direction of polarization between the two laser beams after being mixed is shown in FIG. 10. The second laser beam is indicated with a vector OL, while the signal light is indicated with a vector OR (or OR').

The data to be read is stored as the presence/non-presence of a pit on the recording medium 906. Hence, in the case where a pit does not exist at the point to which the condensed first laser beam is radiated onto the disc 905, that is, the surface of the recording medium 906 is a mirror face, most of the reflected laser beam that repasses the same optical path is converted into a plane wave by the condenser lens 904, and reaches the photodiode 909. Meanwhile, in the case where a pit exists at this point, more than half of the radiated laser beam is scattered at an angle larger than the effective numerical aperture of the condenser lens 904. As a result, the amount of components reaching the photodiode 909 as plane waves is reduced. Hence, in FIG. 10, the vector OR stands for signal light in a case of presence of a pit, while the vector OR' stands for signal light in a case of non-presence of a pit.

Furthermore, the configuration of Example 3 is arranged so that the polarization plane of the second laser beam and that of the first laser beam coincide with each other. The beat signal component having a frequency of $(v_1-v_2)$, the signal being output in a case where a light coherent detection is performed by the photodiode 909 under such conditions, is expressed by the following Formula (20):

$$I_{AC} = \eta a_R a_L \cos\{2\pi(v_1-v_2)t + \phi_R - \phi_L\} \quad (20)$$

where, $a_R$ denotes a parameter changing depending on whether the recorded data is "0" or "1" is, which changes in a range from $a_R$ to $a_{R'}$.

Figure 11:
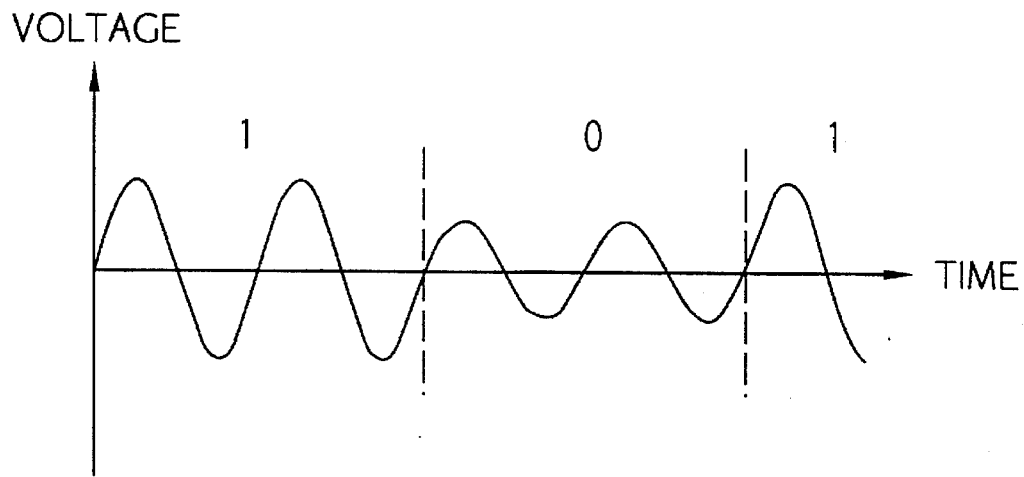
FIG. 11 is a diagram showing an output signal waveform of a preamplifier of the optical data reading apparatus of Example 3.

An exemplary waveform of an output from an amplifier 913 is shown in FIG. 11. As can be seen from this figure, the output from the amplifier 913 is in accordance with the ASK modulation method in which the amplitude of the beat signal changes depending on whether the recorded data is "0" or "1".

This ASK modulation signal is passed through a narrow-band pass filter 914, whereby unnecessary noise components other than the beat signal frequency component are removed from the signal. Thereafter, the amplitude thereof is detected by an amplitude detection circuit 915. A usual envelope detection circuit is used as the amplitude detection circuit 915 employed herein. In this way, a voltage in accordance with the signal amplitude shown in FIG. 11 is output. Finally, the output is input to a voltage comparison circuit 916 wherein a signal is reproduced.

Also in Example 3, as is apparent from Formula (20), the signal amplitude concerned with the recorded data has the form in which the signal amplitude is pseudo-amplified by the second laser beam. Accordingly, for the same reasons explained in Examples 1 and 2, a C/N value higher than that of the ordinary direct detection is obtained. Actually, data reading is performed at a reading rate four times (3 Mbps) higher than that of the conventional one, from a disc of a storage density eight times (2 Mbit/mm$^2$) higher than that of the conventional one. As a result, the maximum C/N value of 57 dB is obtained when the intensity of the second laser beam is set at 7 mW. The reading is performed also in the conventional method. Under the same conditions, only a C/N value of 29 to 33 dB is obtained. This C/N value is sufficient for realizing a bit error rate of $10^{-7}$.

Next, a system in Example 3, provided for mutually keeping the light frequency difference between the two semiconductor laser elements 901 and 910, will be described. An optical fiber 917 of a single mode is coupled to each of the semiconductor laser elements 901 and 910. The light emitted from the rear face of the first semiconductor laser elements 901 is incident on the optical fiber 917. The incident light is branched into two parts by a branching section 918. One of the branched parts is incident onto a photodiode 920 for monitoring an output, whereby the intensity of the laser beam output from the first semiconductor laser elements 901 is detected by the photodiode 920. On the other hand, the other of the branched parts is guided to a mixing section 922 consisted of a directional coupler.

The light output from the rear face of the second semiconductor laser elements 910 is likewise incident on the optical fiber 917. After the light is branched into two parts, one of the branched parts is input onto a photodiode 921, while the other one of the branched parts is guided onto the mixing section 922.

At the above-mentioned mixing section 922, the first and second laser beams are mixed with each other at an intensity ratio of 1:1. The mixed beam is incident onto a balance type light receiving circuit 923 composed of two photodiodes so as to be subject to a light coherent detection. An output of the balance type light receiving circuit 923 has its DC components being removed by a high pass filter 924, is appropriately amplified by an amplifier 925 and thereafter is subject to frequency discrimination by a frequency discrimination circuit 926. An output from this frequency discrimination circuit is input to a proportion (P) control circuit 927. The P control circuit 927 compares the output from the frequency discrimination circuit and a DC set voltage separately applied from the outside, and outputs a control signal so that these two values are equal to each other. In accordance with this control signal, a laser drive circuit 928 controls the drive conditions for the first and second semiconductor laser elements 901 and 910. Thus, although the light frequency $v_1$ or $v_2$ of each laser beam varies by about 1 to 3 THz due to the fluctuations of the temperatures of the laser elements 901 and 910, of a drive current and the like, the light frequency difference $(v_1-v_2)$ between the two laser beam is able to be kept constant, by making the light frequency $v_2$ of the second laser beam follow the light frequency $v_1$ of the first laser beam. In Example 3, the feedback control is performed by setting the beat signal frequency $(v_1-v_2)$ at 20 MHz. This value of frequency is seven times higher than the bit reading rate of 3 Mbps. As a result, though the spectral line width of each laser beam is about 1 MHz, the demodulation of a base band signal from an ASK signal is possible. The manner of controlling these elements and settings thereof in the initial state and the like are not described in detail here, because they are the same as those described in Example 1.

In the above-mentioned Examples 1 and 2, in order to control the light frequency difference between the two laser beams, the reflection of the first laser beam by the disc is necessitated. However, the configuration of Example 3 allows the light frequency difference to be controlled even if the optical disc 905 is not mounted on the apparatus. Accordingly, the apparatus of Example 3 can dispense with the initial operation of the light frequency control, which is required for the configurations of Examples 1 and 2 to perform each time the disc is exchanged. However, the initial operation is necessary only at the time of switching the power source on.

The automatic control of the light intensity of the laser beams output from the semiconductor laser element 901 and 910 is performed by P control circuits 929 and 930, by comparing outputs of the photodiodes 920 and 921 and a set voltage.

As described above, by using an optical data reading system having a configuration shown in FIG. 9, to which a light coherent detection is applied, a C/N value as high as 57 dB can be realized under the conditions of a recording density (2 Mbit/mm$^2$) eight times higher than that of the conventional one and a reading rate (3 Mbps) four times higher than that of the conventional one, whereby a bit error rate of 10$^{-7}$ is achieved.

EXAMPLE 4

The optical data reading apparatus of Example 4 will be described hereinafter.

In Examples 1 to 3, in order to prevent the lowering of the bit error rate at the time of reading data, which arises in conventional apparatus when data is recorded at a higher density or when the data is read out at a higher speed, a method for assuring a low bit error rate for an optical disc of a single-layered recording medium is described.

Apart from the above-mentioned method, the problem of lowering a bit error rate at the time of reading data caused by recording data at a higher density may be prevented by reading data from a disc with a multi-layered recording medium. Namely, the recording medium is multi-layered in the thickness-wise direction while the recording area per bit is fixed. Such a method for reading data from the disc with a multi-layered recording medium has been conventionally examined. However, in order to select the data of which layer within the multi-layered recording medium is to be read, the focal depth of a laser beam condensed by a lens is utilized. Hence, due the condition of the other layers, noise is overlapped with the reflection beam having the data from the layer to be read, which makes it difficult to obtain a bit error rate sufficient for practical use.

The present invention can also be applied to such an optical disc with a multi-layered recording medium, thereby exerting effects thereof.

Figure 12:
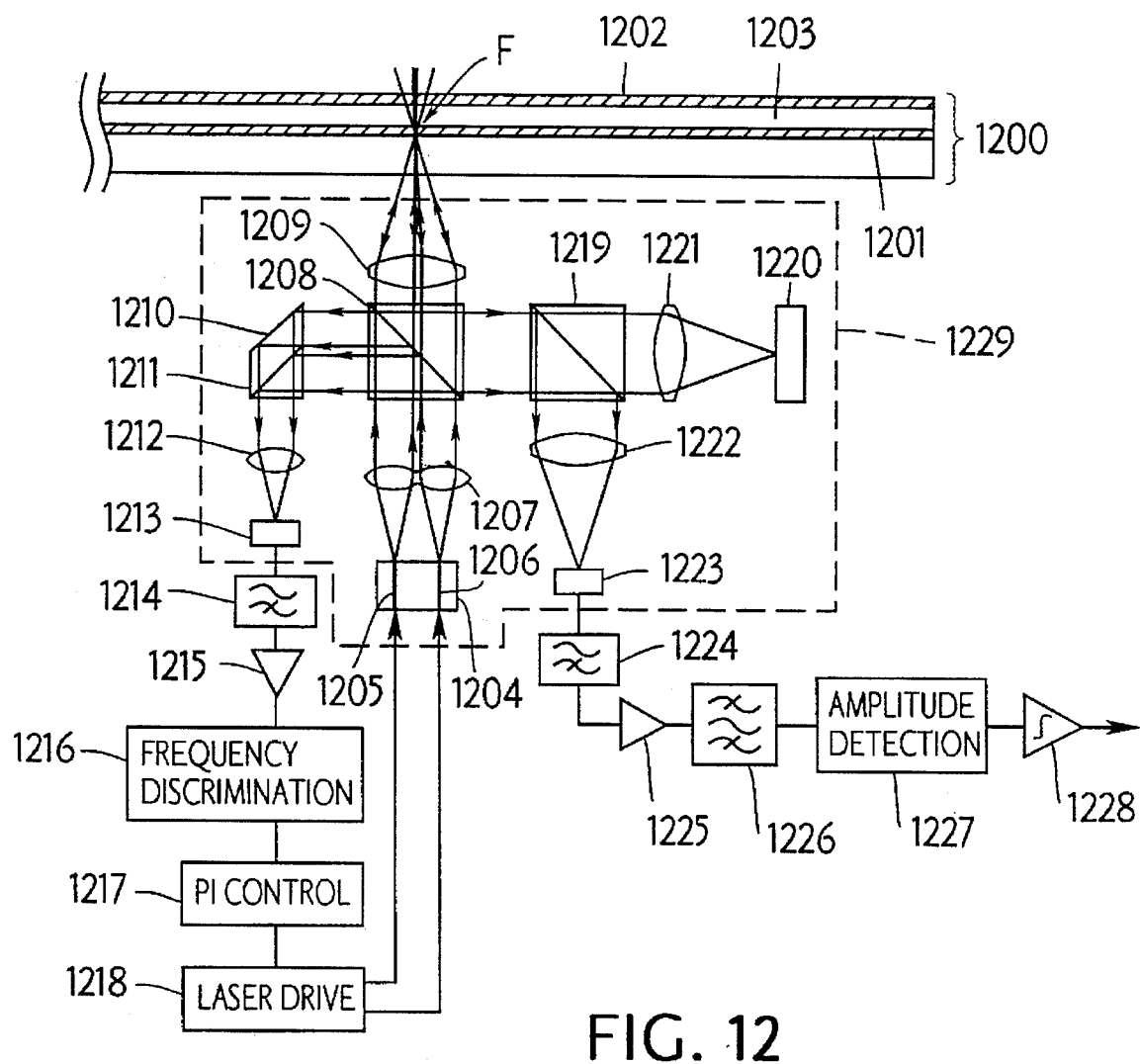
FIG. 12 is a diagram showing a configuration of an optical data reading apparatus of Example 4.

Referring to FIG. 12, an optical data reading apparatus of Example 4 will be described hereinafter. FIG. 12 shows a schematic configuration of the optical data reading apparatus of Example 4, in the case of adopting a multi-layered optical disc apparatus having a two-layered recording medium. In an optical disc 1200, first and second recording medium layers 1201 and 1202 are disposed parallel to each other so as to sandwich a transparent partition layer 1203. In these recording medium layers 1201 and 1202, digital data is recorded in either of two states of scattering/non-scattering of light.

First and second laser beams emitted from a first laser stripe 1205 and a second laser stripe 1206 of a two-wavelength semiconductor laser element 1204 are respectively converted into plane waves by a lens array 1207. The interval between the laser stripes 1205 and 1206 of the two-wavelength semiconductor laser element 1204 is the same as the interval between two optical axes of the lens array 1207. Herein, the interval is set at 2000 μm. Also, the angle at which the laser beam is emitted from the semiconductor laser element 1204 and the focal length of the lenses of the lens array 1207 are designed so that the two laser beams converted into plane waves do not overlap with each other.

The two-wavelength semiconductor laser element 1204 is formed by integrating two laser elements of normal distributed feedback laser type, the elements having the same structure and provided with separate electrodes. The difference in wavelength between two laser beams is approximately 0.0003%. By using such an integrated type laser 1204, the following effects are obtained:

(1) The interval between two laser beams can be precisely determined. As a result, the assembling process of an optical system dealing with these two beams can be easily and highly reliably adjusted.

(2) Since the two laser elements are close to each other, they are operated in the same thermal condition. Thus, it is possible to restrain the relative difference in wavelength between the two laser beams due to temperature changes to an extremely low value, i.e., 0.1 nm or less.

(3) The optical system can be miniaturized by using independent laser elements.

Herein, a laser beam having a wavelength of 785 nm is used both as the first and second laser beams. Hence, the light frequencies $v_1$ and $_2$ are about 382 THz, and the frequency difference ($v_1-v_2$) therebetween is controlled by the feedback circuit similar to the above-mentioned one so as to be a fixed value of 200 MHz. Also, the first and second laser beams emitted from the two-wavelength semiconductor laser are both linearly polarized with the same direction of polarization. The light output from each of the laser elements is 5 mW (corresponding to the light intensity of 0.8 mW on the recording medium).

Figure 13:
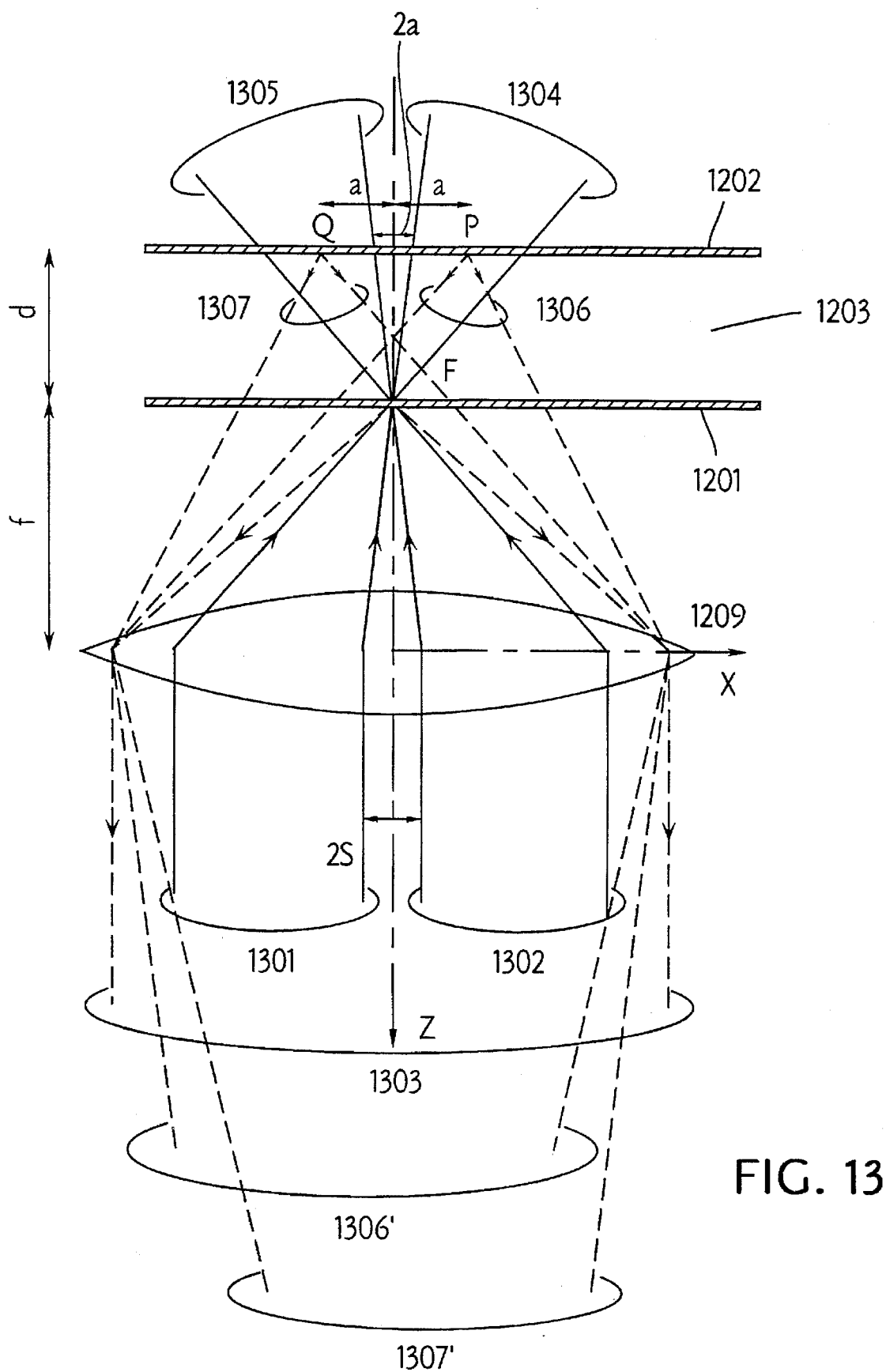
FIG. 13 is a diagram showing the state of the light scattered and reflected by two recording medium layers in an optical data reading apparatus of Example 4.

Under such a situation, the two laser beams converted into plane waves are respectively halved by a beam splitter 1208. The two laser beams traveling straight through the beam splitter 1208 are condensed by a lens 1209 to the same focal point F. The two laser beams condensed at the focal point F occupy a common space only around the focal point F. More specifically, as shown in FIG. 13 showing an enlarged view of the vicinity of the recording medium of the optical disc 1200, the two plane wave laser beams 1301 and 1302 are condensed by the lens 1209 onto the same focal point F.

In the case Where a light scattering body exists at the focal point F (corresponding to the case where the recorded data is "1"), the first and second laser beams are both scattered by this light scattering body. The reflected beams form spherical waves centered at the focal point F and having the same wavefront. These first and second spherical wave laser beams having the same wavefront are converted into plane waves 1303 (hereinafter, referred to as a "signal laser beam") having the same wavefronts by lens 1209 so as to be incident onto the beam splitter 1208. The signal laser beam 1303, having its traveling direction turned at 90° by the beam splitter 1208, is divided into two parts by a beam splitter 1219. Through a lens 1221, one part of the signal laser beam is incident onto a multi-divided photodiode 1220 for controlling the position of an optical pickup 1229. On the other hand, passing through a lens 1222, the other part of the signal laser beam 1303 is incident onto a photodiode 1223.

As described above, by means of the lens 1209, the first and second laser beams scattered and reflected at the focal point F have been converted into the plane waves 1303 having the same wavefront. Consequently, the wavefronts of the two laser beams are naturally aligned with each other on the light receiving face of the photodiode 1223, which allows a light coherent detection. Thus, a beat signal having a frequency corresponding to the light frequency difference between the two laser beams is generated.

Meanwhile, in the case where a light scattering body does not exist at the focal point F, the two laser beams pass through the first recording medium layer 1201 or are reflected by a mirror face thereof. The laser beams 1304 and 1305 passed through the first recording medium layer 1201 pass through the partition layer 1203 and reach the second recording medium layer 1202. The light scattering bodies are also disturbed over the second recording medium layer 1202, in accordance with the "1" and "0" of the recorded data. Accordingly, each of the laser beams is scattered thereby.

Now, it is assumed that the first and second laser beams are scattered at a point Q and a point P, respectively. Then, the first laser beam scattered at the point P and the second laser beam scattered at the point Q are reflected as spherical waves 1306 and 1307 centered at the scattering points P and Q, respectively. The points P and Q are different from the focal point F of the lens 1209. Hence, the spherical waves 1306 and 1307 are not converted into plane waves by the lens 1209. In this case, since the Second recording medium layer 1202 is located beyond the focal point F, they are converted into convergent spherical waves 1306' and 1307'. Furthermore, since the optical components are located so that the first and second laser beams occupy a common space only around the focal point F, the point P and the point Q never coincide with each other.

Consequently, the wavefronts of the spherical waves 1306 and 1307 scattered at the points P and Q, respectively, are necessarily different from each other. Thus, it is impossible to carry out a coherent detection by the photodiode 1223. In this case, the detection is performed by the mixed two laser beams having different wavefronts. However, the theory explained with reference to FIGS. 3 and 4 in the case of a light coherent detection for plane waves is also applicable to this case. In other words, it is impossible to detect the beat signal component if the wavefront is inclined at a large angle, for the following reasons. Now, it is assumed that the points P and Q are apart from each other by the distance a therebetween, being centered by the optical axis of the lens 1209. Herein, the focal length of the lens 1209 is denoted by f, and the thickness of the partition layer 1203 is denoted by d (for simplicity, the thickness of each of the recording medium layers 1201 and 1202 is assumed to be zero). Then, the following formula is satisfied:

$$f+d \gg a \quad (21)$$

In the x–z coordinates as shown in FIG. 13 where the original point corresponds to the center position of the lens 1209, the position P' $(x_P', z_P')$, $(x_Q', z_Q')$ at which the laser beams scattered at the points P and Q are condensed again by passing through the lens 1209, is computed as follows in accordance with the image formation relationship applied to an ordinary lens:

$$x_P' = -af/d \quad (22)$$

$$x_Q' = af/d \quad (23)$$

$$z_P' = z_Q' = f(d+f)/d = f^2/d \quad (24)$$

In Example 4, f=5 mm, and d=50 μm. So, in accordance with Formula (24), $z_P' = z_Q' = 500$ mm. The value of this $z_P'$ is larger than the interval between the lens 1209 and the lens 1222 (50 mm, in Example 4). Hence, actually, these scattered laser beams are not condensed but are subject to a light coherent detection by the lens 1222 and the photodiode 1223.

Figure 14:
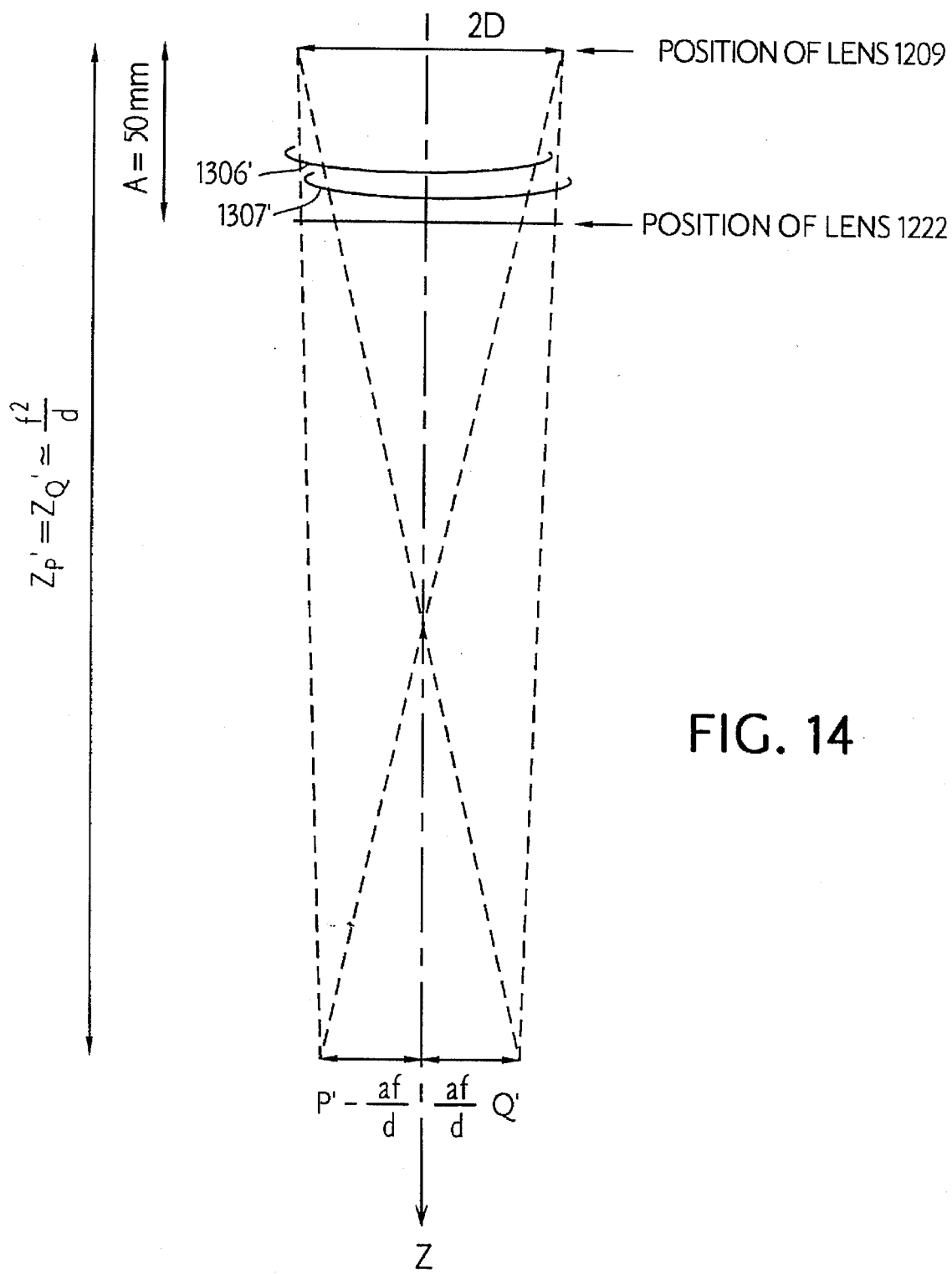
FIG. 14 is an explanatory view showing the state of the wavefront of the laser beam in an aperture of a signal light receiving lens, the light being scattered and reflected at a recording medium layer other than a reading target layer in an optical data reading apparatus of Example 4.

This relationship is shown in FIG. 14, where the interval between the two lenses 1209 and 1222 is denoted by A, and the effective aperture diameter of the lens 1209 is denoted by 2D. Then, a delay in the wavefront of light resulting from the inclination of the wavefronts of the laser beams 1306' and 130' can be approximately expressed by:

$$\xi = afD/d(z_P'-A) \quad (25)$$

Consequently, if this value exceeds the wave-length $\lambda_0$ of the laser beam, the intensity of the beat signal at the time of a light coherent detection is greatly attenuated. Hence, in the state where the beat signal having a considerate intensity is not generated when the scattered laser beams from the points P and Q undergo a light coherent detection, the minimum interval $2a_{min}$ between the two points is expressed as follows:

$$2a_{min} = 2d\lambda_0(z_P'-A)/fD \quad (26)$$

In Example 4, the wavelengths of the first and second laser beams are both 785 nm, and the effective diameter of the lens 1209 is 10 nm. Accordingly, in order that the two scattered reflection beams from the points P and Q do not induce a beat signal at the photodiode 1223, the condition expressed by $2a \geq 2a_{min} = 1$ μm is derived from Formula (26). In an actual apparatus, because the interval 2S between the plane wave of the first laser beam and that of the second laser beams before being incident on the lens 1209 is set at 200 μm, a distance 2σ between the transmission beams of the two laser beams on the second recording medium layer 1202 is about 20 μm. Thus, the condition expressed by Formula (26) is not satisfied with respect to the optical recording apparatus of Example 4. In other words, the first and second laser beams are never radiated on the two points apart from each other only by 1 μm on the second recording medium layer 1202. This condition is expressed as follows:

$$2\sigma \geq 2a_{min} \quad (27)$$

Accordingly, the light passed through the first recording medium layer 1201 and scattered by the scattering body existing on the second recording medium layer 1202 does not generate the beat signal with a large intensity corresponding to the light frequency difference $(v_1-v_2)$ between the first and second laser beams, even if they are incident onto the photodiode 1223.

In this way, with respect to the signal laser beam composed of the first and second laser beams subject to a light coherent detection, only in the case where a light scattering body exists at the focal point F on the first recording medium layer 1201, an output current of the photodiode 1223 includes a beat signal having a frequency which is the light frequency difference $(v_1-v_2)$ between the first and second laser beam.

Figure 15:
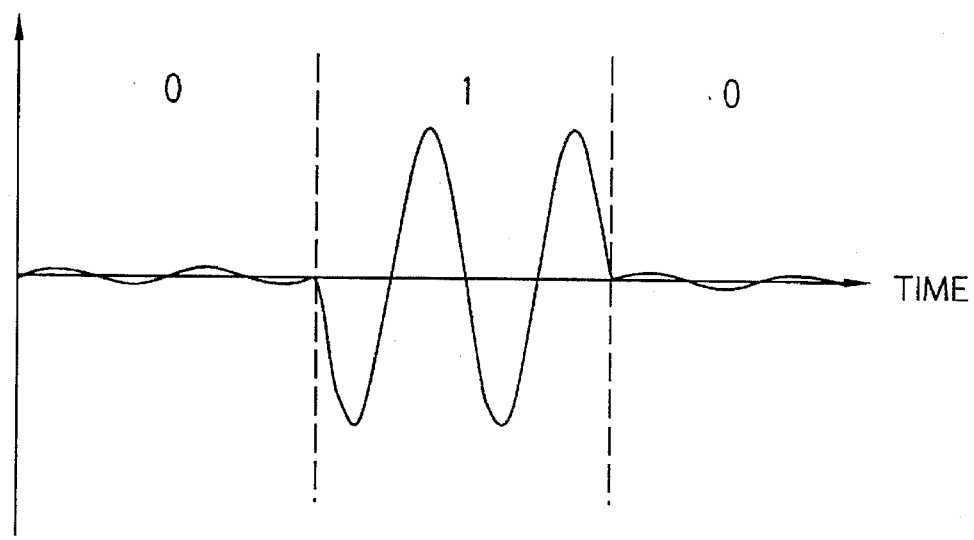
FIG. 15 is a diagram showing an exemplary output signal waveform of a preamplifier of the optical data reading apparatus of Example 4.

Thus, the output from the photodiode 1223 is passed through a high pass filter 1224 so as to extract this beat signal component. Thereafter, the output is amplified by a preamplifier 1225. An exemplary waveform of an output from the preamplifier 1225 is shown in FIG. 15. The waveform is of the beat signal having the light frequency difference $(v_1-v_2)$ between the first and second laser beam and having its amplitude modulated in accordance with "0" and "1" of the data recorded in the first recording medium, i.e., an ASK modulated waveform.

Then, such a signal is fed into a narrow-band pass filter 1226, whereby noise having a frequency component other than the beat signal frequency component is removed. Thereafter, an envelope detection is performed by an amplitude detection circuit 1227. An output voltage from the amplitude detection circuit 1227 is compared by a voltage comparator 1228, and thus reproducing the recorded data.

As described hereinbefore, it becomes possible to read the data recorded into the first recording medium layer 1201 as a presence/non-presence of a light scattering body.

The data is reproduced from the beat signal by thus carrying out the present invention, whereby only the data can be selectively read out from the recording medium layer existing at the focal point F of the lens 1209 (the recording medium layer 1201, in this case). In addition, the data can be certainly separated from the reflection data of other multi-layers, which has been conventionally difficult to realize.

The above descriptions are based on the assumption that data is read from the first recording medium layer 1201. Also in the case where the data is read from the second recording medium layer 1202, by using a similar method, the signal can be read without being affected by the light scattering on the first recording medium layer 1201. However, in this case, it is necessary to control the position of an optical pickup 1229 so as to make the focal point F of the lens 1209 coincide with the position of the second recording medium layer 1202. This positional control of the optical pick-up 1229 is effected by intentionally deviating an output from the multi-divided photodiode 1220 from the condition in which the focal point F coincides with the first recording medium layer 1201.

As for tracking, the tracking performed for the first recording medium layer is the same as that for the second recording medium layer, no mechanize is newly required because the recording medium is multi-layered.

Also, in order to more accurately perform a focus servo, a light coherent detection is introduced to the light receiving operation at the multi-divided photodiode 1220, and an output from each photodiode is detected as the amplitude of a beat signal. It has been found that the control with the focus servo being operative can be highly stably performed by using the beat signal for the control of the position of the optical pickup 1229. However, in the case of Example 4, it is necessary to select a photodiode having a response frequency higher than that of each element of the multi-divided photodiode 1220. Moreover, a high pass filter, a preamplifier, a narrow-band pass filter and circuits for amplitude detection (equivalent to the circuits 1224 to 1227) have to be provided for each photodiode.

Next, a mechanism by which the light frequency difference between the two laser elements 1205 and 1206 included in the two-wavelength semiconductor laser element 1204 is kept constant will be described. The other part of the two laser beams respectively halved by the beam splitter 1208 are mixed by a mirror 1210 and a beam splitter 1211 so that the wavefronts thereof are aligned with each other, and condensed on a light receiving face of a photodiode 1213 by a lens 1212. At the photodiode 1213, these two laser beams are subject to a light coherent detection. Similar to Examples 1 to 3, the light frequency difference $(v_1-v_2)$ between the first and second laser beams is kept constant by the feedback control system composed of a high pass filter 1214, a preamplifier 1215, a frequency discrimination circuit 1216, a proportion integration (PI) control circuit 1217, and a laser drive circuit 1218. The description of the configuration and operation of the circuits are omitted here, since they are described in detail in Examples 1 through 3.

When the data recorded in a single-layered recording medium disc at a recording density of 0.7 Mbit/mm$^2$ is actually read out at a data reading rate of 1 Mbps, a C/N value of 46 dB is obtained after a light coherent detection and reading is realized at a bit error of $10^{-6}$. Also in a conventional optical reading apparatus employing the direct detection is used, from a single-layered recording medium, the data reading with a C/N value of 45 dB and a bit error rate of $10^{-6}$ has been realized.

Next, the reading is performed under the same conditions from a recording medium having two recording layers apart from each other at an interval of 20 μm. In the conventional apparatus, a C/N value is extremely degraded to be 28 dB, while the bit error rate is $10^{-4}$. Conversely, in the apparatus of Example 4, the reading from any recording layer is realized with a C/N value from 43 to 46 dB and a bit error rate of $10^{-6}$. Furthermore, the reading from a recording medium having five recording medium layers apart from each other at an interval of 100 μm is performed in a similar method. As a result, data is read from the uppermost layer with a C/N value of 46 dB and from the lowermost layer with a C/N value of 39 dB. These values sufficiently allow the data reading at a bit error rate of $10^{-5}$.

EXAMPLE 5

The optical data reading apparatus of Example 5 will be described hereinafter.

Figure 16:
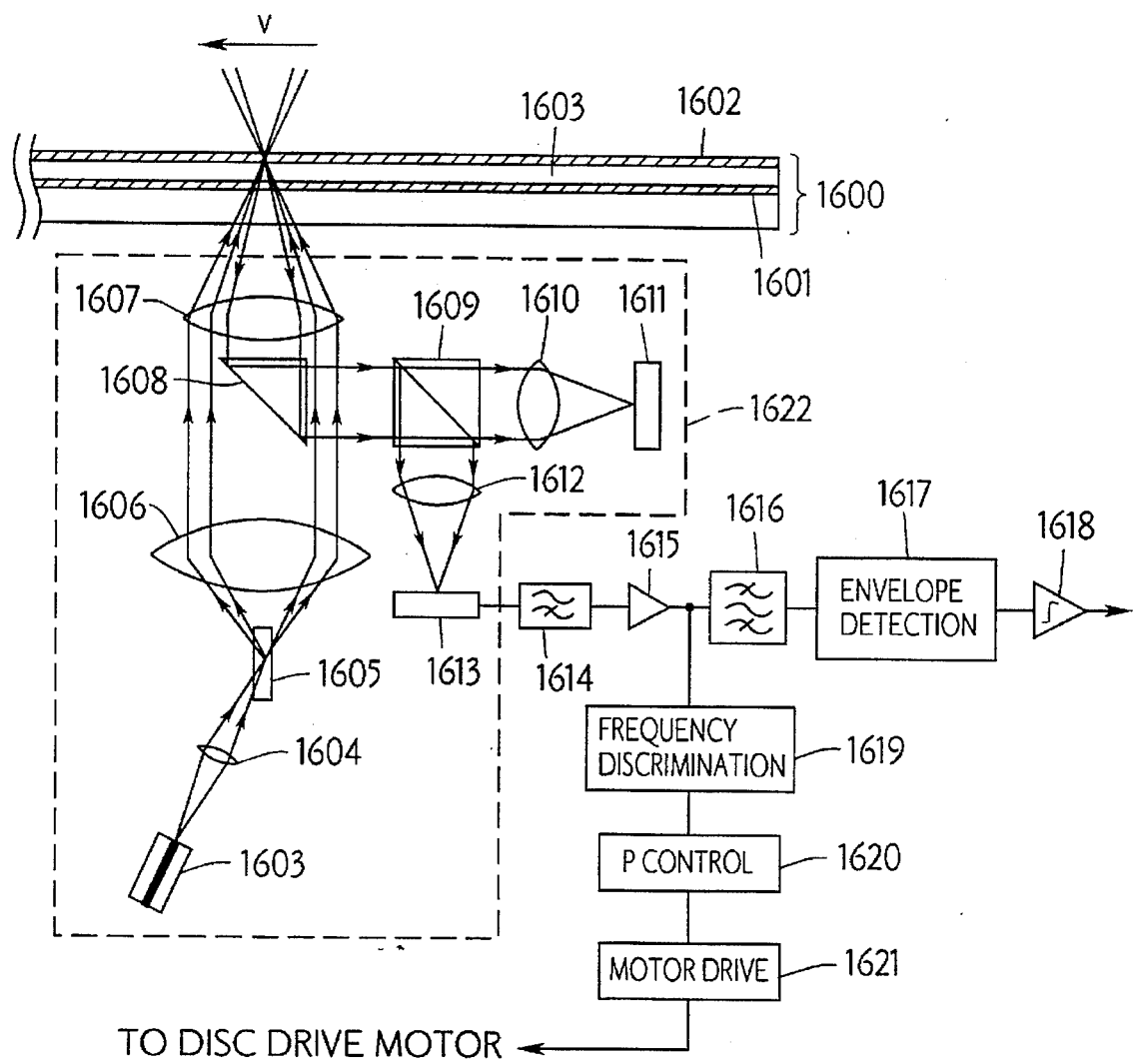
FIG. 16 is a diagram showing a configuration of an optical data reading apparatus of Example 5.

FIG. 16 shows the configuration of the optical data reading apparatus of Example 5, An optical memory disc 1600 of Example 5 includes a first recording medium layer 1601 and a second recording medium layer 1602 separated by a transparent partition layer having a thickness of d. The data is recorded by means of a presence/non-presence of a light scattering body on the recording medium layers 1601 and 1602. The actual recording medium layers 1601 and 1602 are formed of a liquid crystal material dispersed within a solution. In this case, reading of the data is carried out by utilizing a phenomenon obtained in the following manner. First, by using a laser beam, liquid crystal molecules are optically absorbed into light absorbing films sandwiching the liquid crystal layers 1601 and 1602, whereby the liquid crystal layers 1601 and 1602 are heated. Then, the liquid crystal layers are spontaneously quenched, so that the liquid crystal molecules are aligned at random. However, the recording medium layers 1601 and 1602 are not limited to a liquid crystal material, but the effects of the present invention are assured insofar as they can used for recording data as the condition of scattering light. For example, a disc formed by making a non-reloadable pit on a plastic material in a stamp manner may be used.

Figure 17:
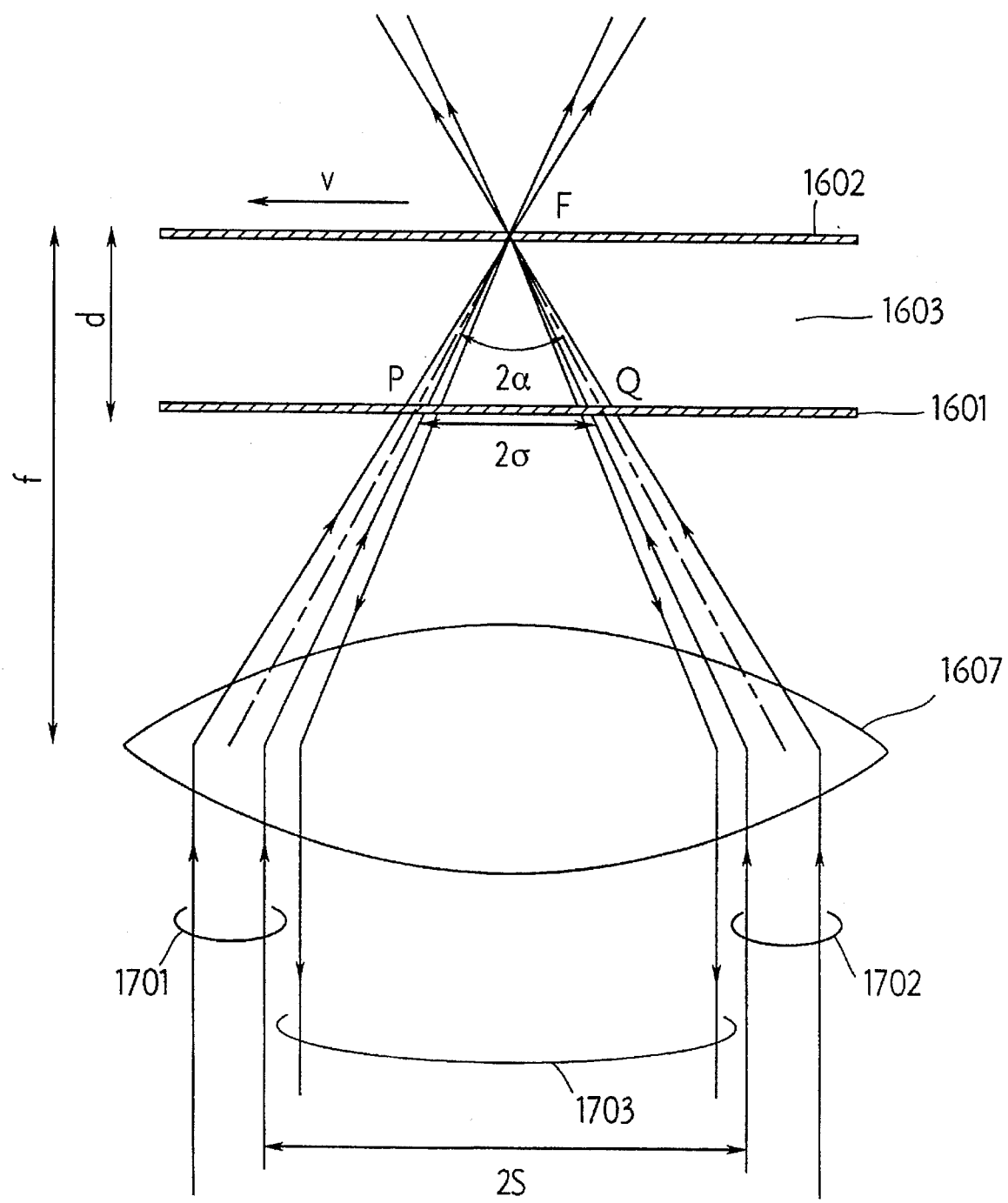
FIG. 17 is a diagram showing the state of the light scattered and reflected by two recording medium layers in an optical data reading apparatus of Example 5.

A laser beam emitted from a semiconductor laser element 1603 is condensed onto a beam splitter 1605 by a lens 1604. The laser beam is divided into two parts by a beam splitter 1605. Thereafter, the respective two parts are converted into two plane waves by the same lens 1606. These two plane waves are condensed and radiated onto the optical memory disc 1600 by a condenser lens 1607. This condition is shown as enlarged view in FIG. 17. As can be seen from this figure, two laser beams 1701 and 1702 having the same light frequency are condensed and radiated onto a common focal point F on the second recording medium layer 1602 at an angle of 2α.

In the case where a light scattering body exists at the light radiation point (common focal point) F of the second recording medium layer 1602, the scattered and reflected light of the two laser beams 1701 and 1702 is converted into plane waves (referred to also as a "laser beam") 1703 again by the lens 1607. That is, the wavefronts of the two laser beams 1701 and 1702 are aligned with each other.

At this time, the optical memory disc 1600 rotationally moves by means of a motor (not shown). Hence, the second recording medium layer 1602 at the light radiation point F moves at a velocity of v (leftward in this figure). Thus, in the case where the two laser beams having the same frequency are radiated onto a moving object parallel to the movement direction at a certain angle, the laser beam 1703 reflected by the moving object undergoes a Doppler shift. Please refer to "O plus E" No. 150 (May), p. 109 for more detailed information about the laser Doppler effect.

Herein, a light frequency $v_1$ of a first laser beam resulting from the laser beam 1701 scattered and reflected by the second recording medium layer 1602 and a light frequency $v_2$ of a second laser beam resulting from the laser beam 1702 which has been likewise scattered and reflected are respectively expressed as follows:

$$v_1 = v_0(1 + 2v \sin \alpha/c) \qquad (28)$$

$$v_2 = v_0(1 - 2v \sin \alpha/c) \qquad (29)$$

where, $v_0$ stands for the light frequency of the laser beams 1701 and 1702 before being radiated onto the second recording medium layer 1602.

From the Formulae (28) and (29), a light frequency difference $(v_1 - v_2)$ between the two laser beams is expressed as follows:

$$v_1 - v_2 = 4v_0 v \sin \alpha/c \qquad (30)$$

Since the light frequency $v_0$ of a laser beam to be radiated and the velocity v are almost constant, the value of $(v_1 - v_2)$ is kept constant. Herein, the movement of the optical memory disc 1600 in the vertical direction with respect to the surface of the disc 1600 is ignored. Actually, the optical memory disc 1600 vertically vibrates simultaneously with performing the rotational movement. The resultant moving speed component makes the light frequency difference between the first and second laser beams 1703 deviate from that expressed by Formula (30). However, in an actual apparatus, the moving velocity v of the recording media 1601 and 1602 caused by the rotation of the optical memory disc 1600, which is 20 m/s or more, is sufficiently higher than that of the optical memory disc 1600 resulting from the vertical vibration, which allows the influence of the vibration to be ignored.

In this way, the laser beam 1703 having different light frequencies $v_1$ and $v_2$, scattered by the light scattering body on the second recording medium layer 1602, can be incident onto a mirror 1608 in the state of having the aligned wavefronts. (Hereinafter, the laser beam 1703 in which the wavefronts of the first and second laser beams are aligned, will be referred to as a "signal light".)

Thereafter, the signal light 1703 with its optical path being turned at 90° by the mirror 1608 is divided into two parts by a beam splitter 1609. The signal light 1703 traveling straight through the splitter 1609 is condensed by a lens 1610 and is incident onto a multi-divided photodetector 1611. In accordance with an output from the multi-divided photodetector 1611, the position of an optical pickup 1622 is controlled so that a condensed light radiation point F is located on the surface of the second recording medium layer 1602.

On the other hand, the other part of the signal light 1703 divided by the beam splitter 1609 is condensed by a lens 1612 and is incident onto a photodetector 1613. As described above, the signal light 1703 has the beams scattered and reflected from the common focal point F and having the aligned wavefronts. Hence, both of the laser beams of the signal light 1703 are subject to a coherent detection by the photodetector 1613. As is expressed by Formula (30), the light frequency difference between the first and second laser beams is almost constant. As a result, a beat signal having a frequency corresponding to the light frequency difference is included in an output from the photodetector 1613.

As described hereinbefore, in the case where a light scattering body exists at the light radiation point F of the second recording medium layer 1602, a beat signal component is included in the output from the photodetector 1613. On the other hand, in the case where no light scattering body exists at the light radiation point F and thus slightly causing reflection, the intensity of the signal light 1703 is greatly reduced. Hence, the amplitude of the beat signal component included in the photodetector 1611 is also attenuated.

Next, the influence of the scattered reflection light from the first recording medium layer 1601 in a case where the focal point F is located on the second recording medium layer 1602 will be described. In this case, the laser beam is scattered and reflected from points P and Q shown in FIG. 17. Due to the characteristics of the laser beam radiation optical system, these two points never coincide with each other. Also, an interval 2S between the two plane wave laser beams 1701 and 1702 is set at 2 mm, a focal length f of the lens is 5.5 mm, and the thickness of the transparent partition layer 1603 is 10 µm. Accordingly, the minimum possible value of a distance 2σ between the points P and Q on the first recording medium layer 1601 is 28 µm.

The theory discussed for Formulae (21) through (27) in Example 4 is also applicable to this case. In order that a beat signal is generated at the photodiode 1613 from the light scattered and reflected from two different points on the first recording medium layer 1601, the distance between two points is required to be less than 10 µm in the practical optical configuration. Accordingly, the distance 2σ between the points P and Q (28 µm at minimum) makes the wavefronts of the laser beams deviate from each other on the photodiode 1613, and thus a beat signal is not generated.

As is apparent from the above discussion, a beat signal is included in the output of the photodiode 1613 only in a case where a light scattering body exists at the laser beam radiation point F of the second recording medium layer 1602. In this case, the output of the photodiode 1613 has its DC components removed by a high pass filter 1614. Thereafter, the beat signal component is amplified by a preamplifier 1615.

Figure 18:
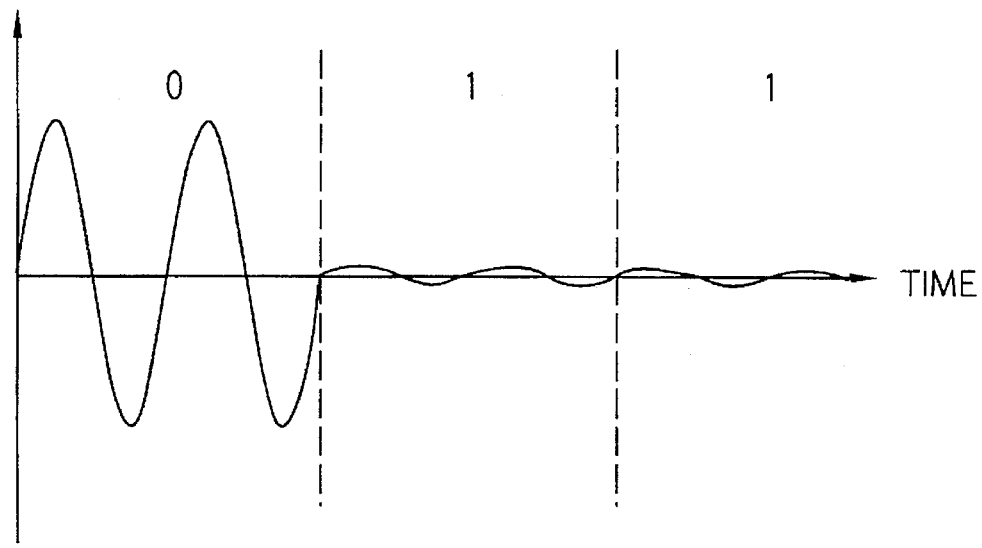
FIG. 18 is a diagram showing an exemplary output signal waveform of a preamplifier of the optical data reading apparatus of Example 5.
Figure 19:
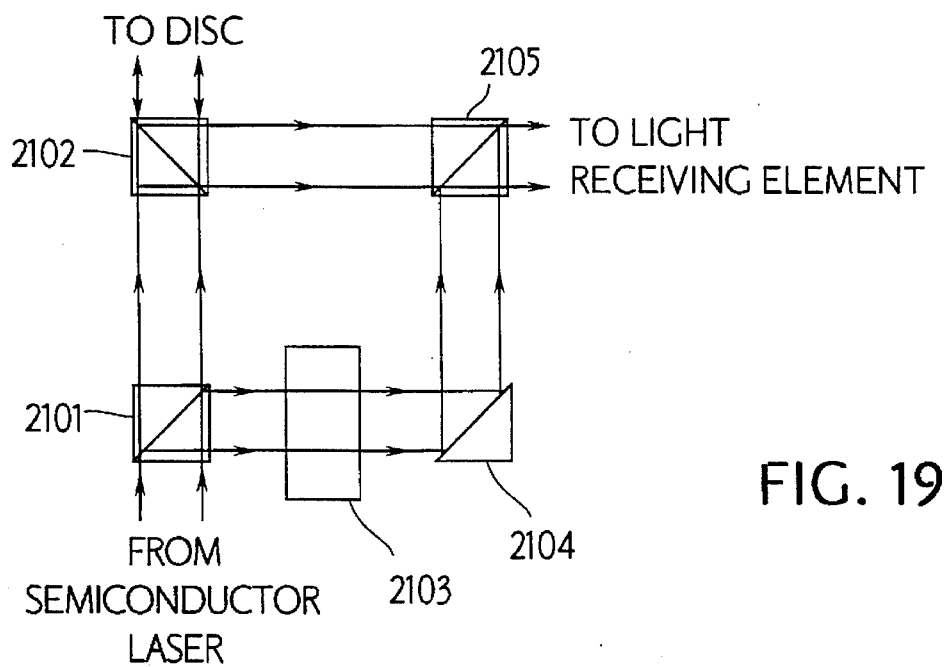
FIG. 19 is a diagram showing the configuration of an optical system using an acoustic optical element for obtaining two different light frequencies, to which the present invention is applicable.
Figure 20:
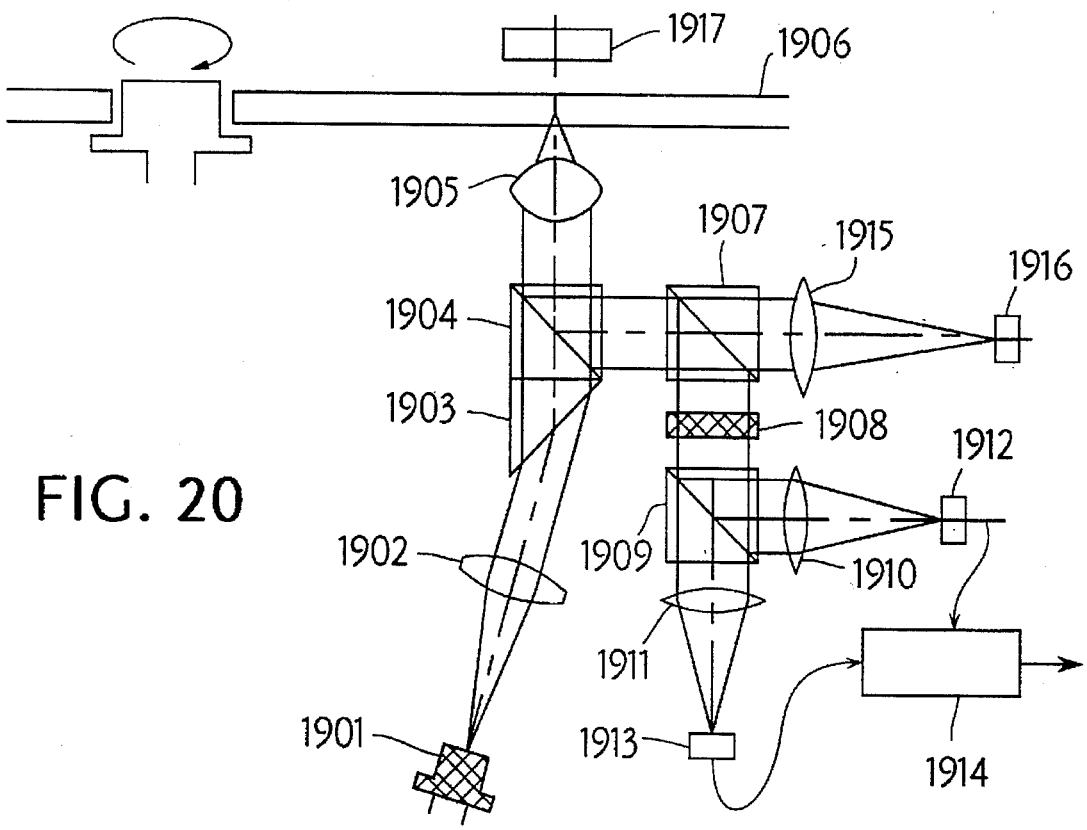
FIG. 20 is a diagram showing the configuration of a conventional optical data reading apparatus.
Figure 21:
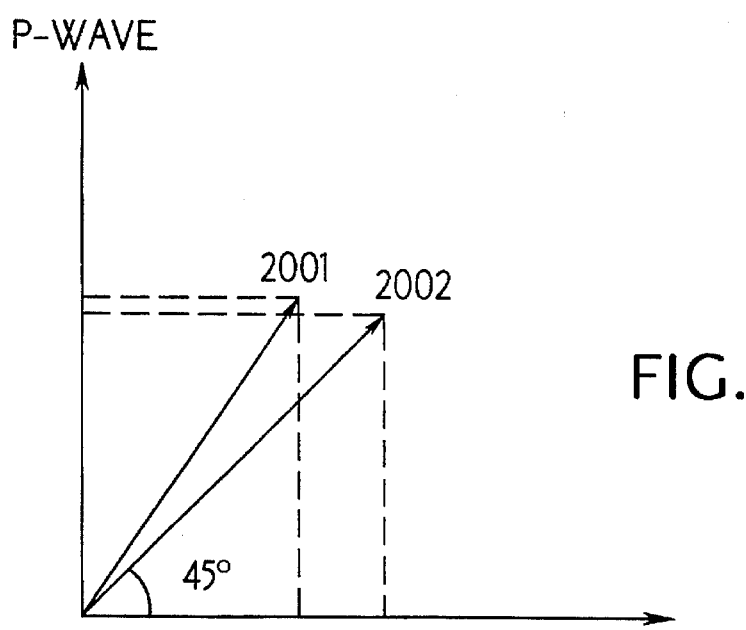
FIG. 21 is a graph showing the state of polarization of the signal light to be divided by a polarization beam splitter in a conventional optical data reading apparatus.

An exemplary waveform of the output of the preamplifier 1615 is shown in FIG. 18. The output waveform is an ASK modulation signal in which the amplitude of a beat signal changes in accordance with "0" and "1" of the recorded data in the second recording medium layer 1602. For reproducing a signal from this ASK modulation signal, similar to the above-mentioned examples, a narrow-band pass filter 1616, an envelope detection circuit 1617 and a voltage comparison circuit 1618 are used. In Example 5, v=20 m/s and 2α=40°, and thus the beat signal frequency $(v_1 - v_2)$ is 66 MHz. This beat signal frequency $(v_1 - v_2)$ is sufficiently higher than the data reading rate of R=1.5 Mbps, which is a value allowing a bit signal to be reproduced from the ASK modulation signal.

Also, as a technique for rotating the optical memory disc 1600, an angular velocity fixed method and a velocity fixed method may be used. Herein, in order to make the pass band width of the narrow-band pass filter 1616 as narrow as possible, the velocity fixed method is employed in Example 5. The control in accordance with the velocity fixed method are performed in the following manner.

First, the frequency of a beat signal from the preamplifier 1615 is detected by a frequency discrimination circuit 1619. As is expressed in Formula (30), the beat signal frequency $(v_1-v_2)$ includes data on the velocity v. Consequently, the detected value of this data and a set voltage value separately applied from the outside are compared by a proportion (P) comparison circuit 1620, and a rotating speed of the motor is modified by a motor drive circuit 1621 so that the two values are equal to each other. Thus, the velocity v can be kept constant.

In addition, as is expressed in Formula (30), the beat signal frequency is determined by the velocity v and the light frequency $v_0$ of the radiation laser beam. So, in order to control the velocity, the frequency $v_0$ of the radiation laser beam is required to be constant. Hence, in Example 5, a distributed feedback laser element characterized by little variation in frequency is employed as the semiconductor laser element. Also, as another technique for keeping the velocity constant, there is a method of detecting the rate of reproduced bit data and controlling the rotating speed of the motor so as to make the value of the rate constant, whereby the same effects are obtainable.

The above-mentioned configuration allows the recorded data to be read through the change in the amplitude of a beat signal generated by a coherent detection, without necessitating a feedback circuit of complicated configuration by which the light frequency difference between laser outputs from two semiconductor laser elements is held constant. Furthermore, it is possible to read recorded data from a multi-layered recording disc 1600 without being affected by the scattering of light from the layers other than a target reading layer. Using this apparatus of Example 5, data is actually read from a two-layered disc of a recording density of 1 Mbit/mm$^2$ at a data reading rate of 1.5 Mbps. As a result, in a case where the intensity of each of two beams on the recording medium is 0.5 mW, a C/N value of 51 dB and a bit error rate of $10^{-7}$ are realized. Furthermore, when the apparatus of Example 5 is used for reading data from a disc with a single-layered recording medium, the same characteristics as those in a case of the two-layered disc are obtained, and the reading is realized at a bit error rate of $10^{-7}$. This result shows that the apparatus of Example 5 is sufficiently usable for reading of data from a conventional optical disc.

As described in detail hereinbefore, the present invention makes it possible to achieve the following effects:

(1) In reading optical data, a coherent detection is performed by using two laser beams having a frequency difference larger than a data reading rate, a C/N value sufficient for reading and reproducing the data is assured even if light power per bit is weak.

(2) By radiating two laser beams having different two light frequencies onto a common focal point on an optical recording medium, a sufficient C/N value is assured even in the case of reading and reproducing data from a specific medium within a multi-layered recording medium.

(3) By detecting a frequency of a beat signal component of a light coherent detection output and performing a control so that the value thereof is held constant, a carrier frequency at the time of data reproduction is stabilized, and a bit error rate at the time of recorded data reproduction is restrained to be small.

(4) The two laser beams radiated onto a common focal point on an optical recording medium are converted into beams having the same frequency from the same light source. At the same time, by moving the recording medium, a Doppler shift is applied to the light frequency of the reflection light thereof. Thus, it becomes possible to obtain two laser beams having a constant frequency difference by an optical system having a single laser beam source and not necessitating extra optical elements for the shift in light frequency. As a result, an optical data reading system utilizing a coherent detection is simplified and an apparatus for the system is small-sized.

Also, the present invention is not limited to the above-mentioned examples. Naturally, the present invention also exerts its effects in the case where the specific optical configuration and an electrical circuitry are different, in the case where a signal processing method at the time of signal reproduction is different, in the case where various numerical parameters such as a beat signal frequency, a data reading rate, a data recording density, a spectral line width of a semiconductor laser element, etc., are different, and in the case where the number of layers of a multi-layered recording medium is more than two. Furthermore, the present invention also exerts its effects in the case where a means for generating light having two different wavelengths for a light coherent detection at a light receiving element (i.e., the means utilizing an automatic frequency control circuit and a Doppler shift effect caused by movement of the disc) is different. Such a configuration is realized, for example, by a method of dividing laser beam from one semiconductor laser element into two parts by a beam splitter 2101 and shifting the light frequency of one part thereof by an acoustic optical element 2103.

In this case, the other part of the laser beam divided by a beam splitter 2101 is radiated onto an optical disc through the beam splitter 2101. The light reflected by an optical disc has its traveling direction turned by a beam splitter 2102, and then is incident onto a beam splitter 2105. The light with its light frequency being converted by the acoustic optical element 2103 has its traveling direction turned by a mirror 2104, and is incident onto the beam splitter 2105. At the beam splitter 2105, the laser beam having two different light frequencies is mixed in the state that the wavefronts of the two light are aligned with each other, so as to be guided to a light receiving element.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical data reading method for photoelectrically converting reflection light of a laser beam radiated on a recording medium and thereby reproducing digital data recorded in the recording medium, comprising the steps of:

performing a coherent detection by photoelectrically converting a first laser beam having a light frequency $v_1$ and a second laser beam having a light frequency $v_2$, where $v_1-v_2 \geq R$ (R: rate of reading the digital data), in a state where wavefronts of the first and second laser beams are aligned with each other;

detecting temporal changes of either an amplitude or a phase of a beat signal component of the first and second laser beams, having a frequency of $(v_1-v_2)$ and being included in a photoelectrically converted output;

reading the digital data recorded in the recording medium based on a result of detection; and wherein, based on a value of a beat signal frequency detected from the beat signal component, two semiconductor laser light sources for emitting the first and second laser beams are controlled so that a light frequency difference between the first and second laser beams is kept constant.

2. An optical data reading method for photoelectrically converting reflection light of a laser beam radiated on a recording medium and thereby reproducing digital data recorded in the recording medium, comprising the steps of:

having a light frequency $v_1$, and a second laser beam having a light frequency $v_2$, where $v_1-v_2 \geq R$ (R: rate of reading the digital data), in a state where wavefronts of the first and second laser beams are aligned with each other;

detecting temporal changes of either an amplitude or a phase of a beat signal component of the first and second laser beams, having a frequency of $(v_1-v_2)$ and being included in a photoelectrically converted output;

reading the digital data recorded in the recording medium based on a result of detection; and wherein, a laser beam having the same light frequency is divided into two parts and the divided laser beam is condensed and radiated onto one identical point on the recording medium in a common focal point state and at a certain angle, while the recording medium is moved in a direction of the angle formed when the divided laser beam is condensed and radiated, and thereby a light frequency difference between the first and second laser beam is kept constant.

3. An optical data reading apparatus for photoelectrically converting reflection light of a laser beam radiated onto a recording medium having at least one recording medium layer and thereby reproducing digital data recorded in the recording medium, comprising:

laser beam generating means for generating a first laser beam having a light frequency $v_1$ and a second laser beam having a light frequency $v_2$ from a laser beam emitted from at least one semiconductor laser light source;

between the first and second laser beams at a substantially constant value higher than rate R (R: rate of reading the digital data);

mixing means for mixing the first and second laser beams in a state that wavefronts thereof are aligned with each other;

at least one photoelectrically converting means for photoelectrically converting the mixed first and second laser beams;

detecting means for detecting temporal changes of either an amplitude or a phase of a beat signal component of the first and second laser beams, having a frequency of $(v_1-v_2)$ and being included in an output of the photoelectrically converting means;

reproducing means for reproducing the digital data recorded in the recording medium from a detection output of the detecting means; and wherein the frequency difference keeping means controls two semiconductor laser light sources for emitting the first and second laser beams based on a value of a beat signal frequency detected from the beat signal component so that a light frequency difference between the first and second laser beams is kept constant.

4. An optical data reading apparatus for photoelectrically converting reflection light of a laser beam radiated onto a recording medium having at least one recording medium layer and thereby reproducing digital data recorded in the recording medium, comprising:

laser beam generating means for generating a first laser beam having a light frequency $v_1$ and a second laser beam having a light frequency $v_2$ from a laser beam emitted from at least one semiconductor laser light source;

frequency difference keeping means for keeping a frequency difference of $(v_1-v_2)$ between the first and second laser beams at a substantially constant value higher than rate R (R: rate of reading the digital data);

mixing means for mixing the first and second laser beams in a state that wavefronts thereof are aligned with each other;

at least one photoelectrically converting means for photoelectrically converting the mixed first and second laser beams;

detecting means for detecting temporal changes of either an amplitude or a phase of a beat signal component of the first and second laser beams, having a frequency of $(v_1-v_2)$ and being included in an output of the photoelectrically converting means;

reproducing means for reproducing the digital data recorded in the recording medium from a detection output of the detecting means; and wherein the frequency difference keeping means divides a laser beam having the same light frequency into two parts and condenses and radiates the divided laser beam onto one identical point on the recording, medium in a common focal point state and at a certain angle, while moving the recording medium in a direction of the angle formed when the divided laser beam is condensed and radiated, and thereby keeping a light frequency difference between the first and second laser beams constant.

* * * * *